(12) United States Patent
Hue et al.

(10) Patent No.: US 8,465,184 B2
(45) Date of Patent: Jun. 18, 2013

(54) SWITCHING PROCEDURE OF THE MOTOR VEHICLE HEADLIGHT LIGHTING MODE

(75) Inventors: David Hue, Chatou (FR); Julien Moizard, Paris (FR); Patrice Reilhac, Esslingen (DE)

(73) Assignee: Valeo Vision, Bobigny (FR)

( * ) Notice: Subject to any disclaimer, the term of this patent is extended or adjusted under 35 U.S.C. 154(b) by 761 days.

(21) Appl. No.: 12/640,250

(22) Filed: Dec. 17, 2009

(65) Prior Publication Data
US 2010/0157614 A1 Jun. 24, 2010

(30) Foreign Application Priority Data

Dec. 19, 2008 (FR) ...................................... 08 07302

(51) Int. Cl.
*B60Q 1/00* (2006.01)
*F21V 1/00* (2006.01)

(52) U.S. Cl.
USPC ............ 362/466; 362/465; 340/602; 382/104

(58) Field of Classification Search
USPC ............ 340/469, 602; 362/465, 466; 382/104
See application file for complete search history.

(56) References Cited

U.S. PATENT DOCUMENTS

| 5,894,272 | A | 4/1999 | Brassier |
| 6,969,183 | B2 * | 11/2005 | Okubo et al. ................. 362/466 |
| 7,692,535 | B2 | 4/2010 | Michiyama |
| 8,045,760 | B2 * | 10/2011 | Stam et al. .................... 382/104 |
| 2004/0201483 | A1 | 10/2004 | Stam |
| 2007/0242470 | A1 | 10/2007 | Michiyama |

FOREIGN PATENT DOCUMENTS

| DE | 102005061094 A1 | 9/2006 |
| EP | 0516527 A1 | 12/1992 |

* cited by examiner

*Primary Examiner* — Stephen F Husar
(74) *Attorney, Agent, or Firm* — Jacox, Meckstroth & Jenkins

(57) ABSTRACT

An automatic headlight switching procedure for motor vehicles, designed to emit a beam of light from one lighting mode to another lighting mode. The process features the steps of when the headlights are in a first lighting mode, detecting the backscatter of the headlight beam onto a phenomenon of visibility disturbance; increasing the lighting range of the headlight beam in relation to a maximum authorized range in accordance with the detected backscatter; and switching the headlights to a second lighting mode when the backscatter is below a first determined threshold.

19 Claims, 16 Drawing Sheets

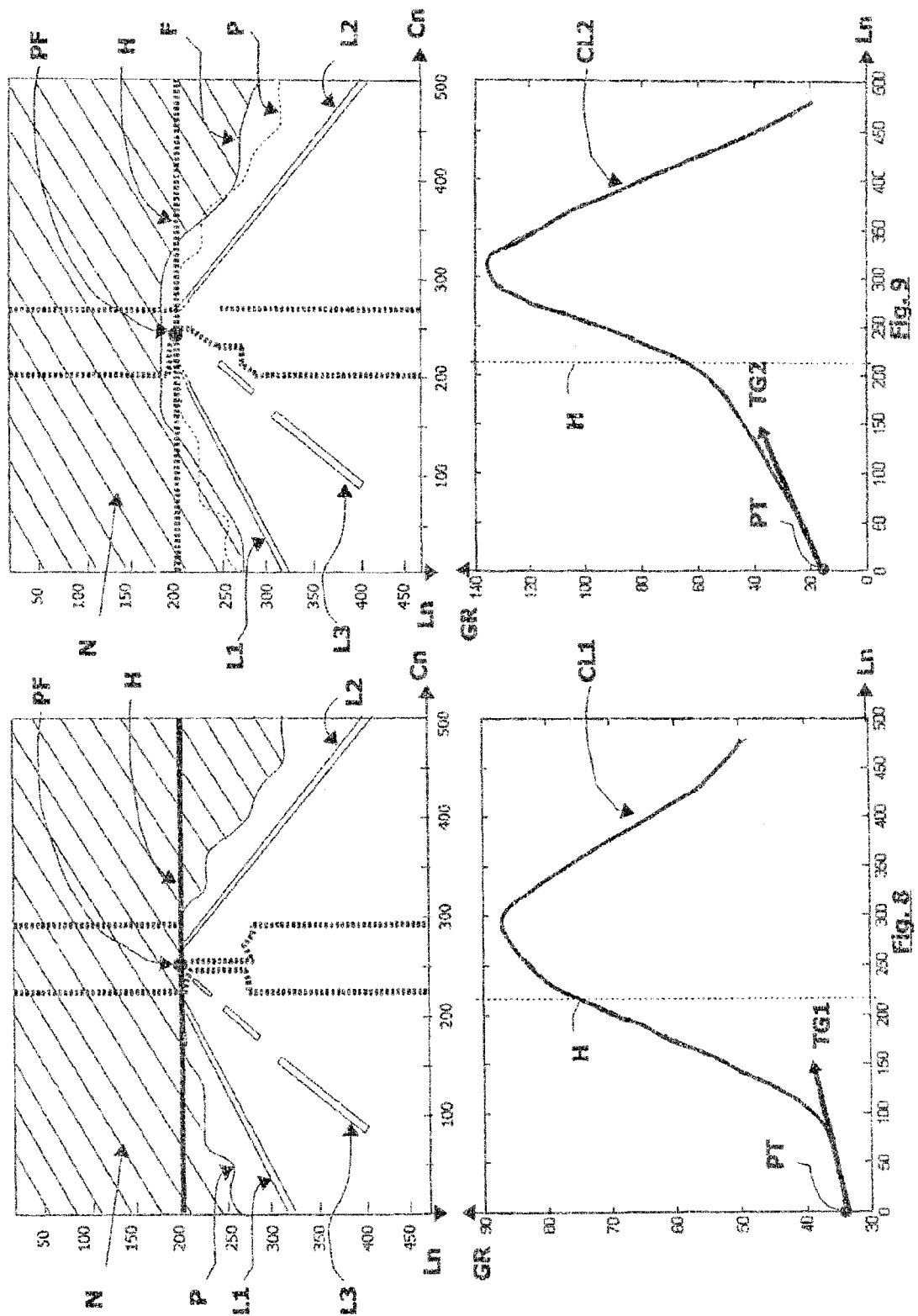

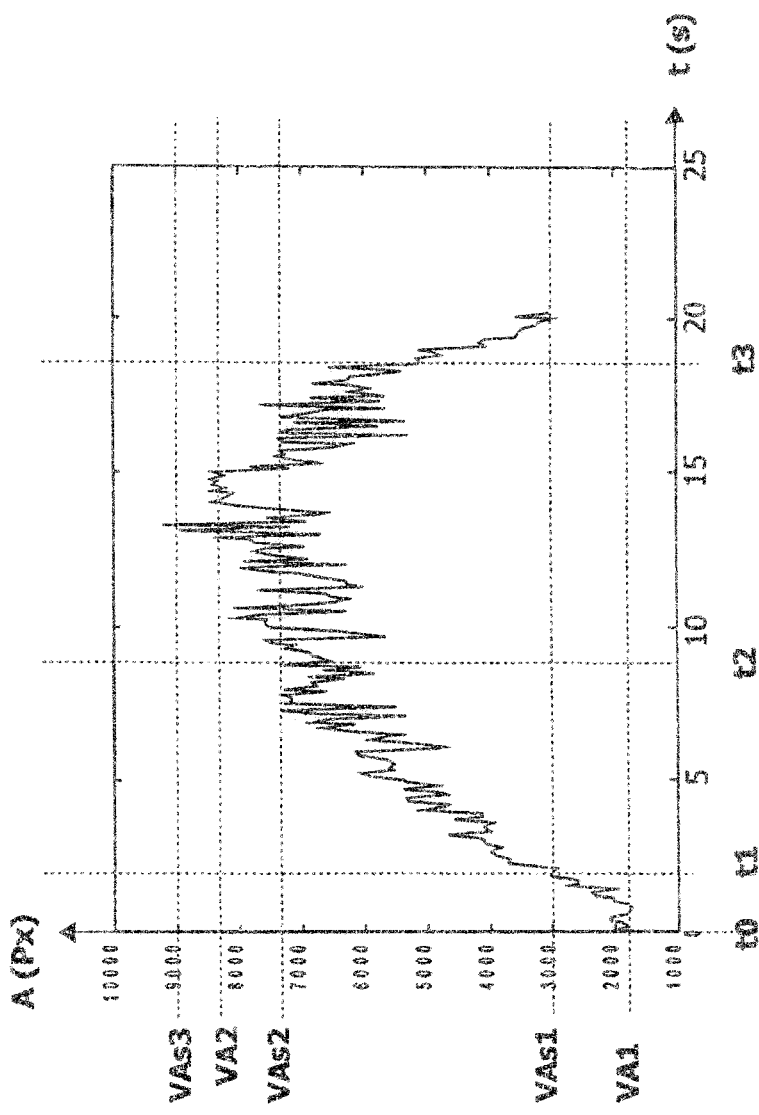

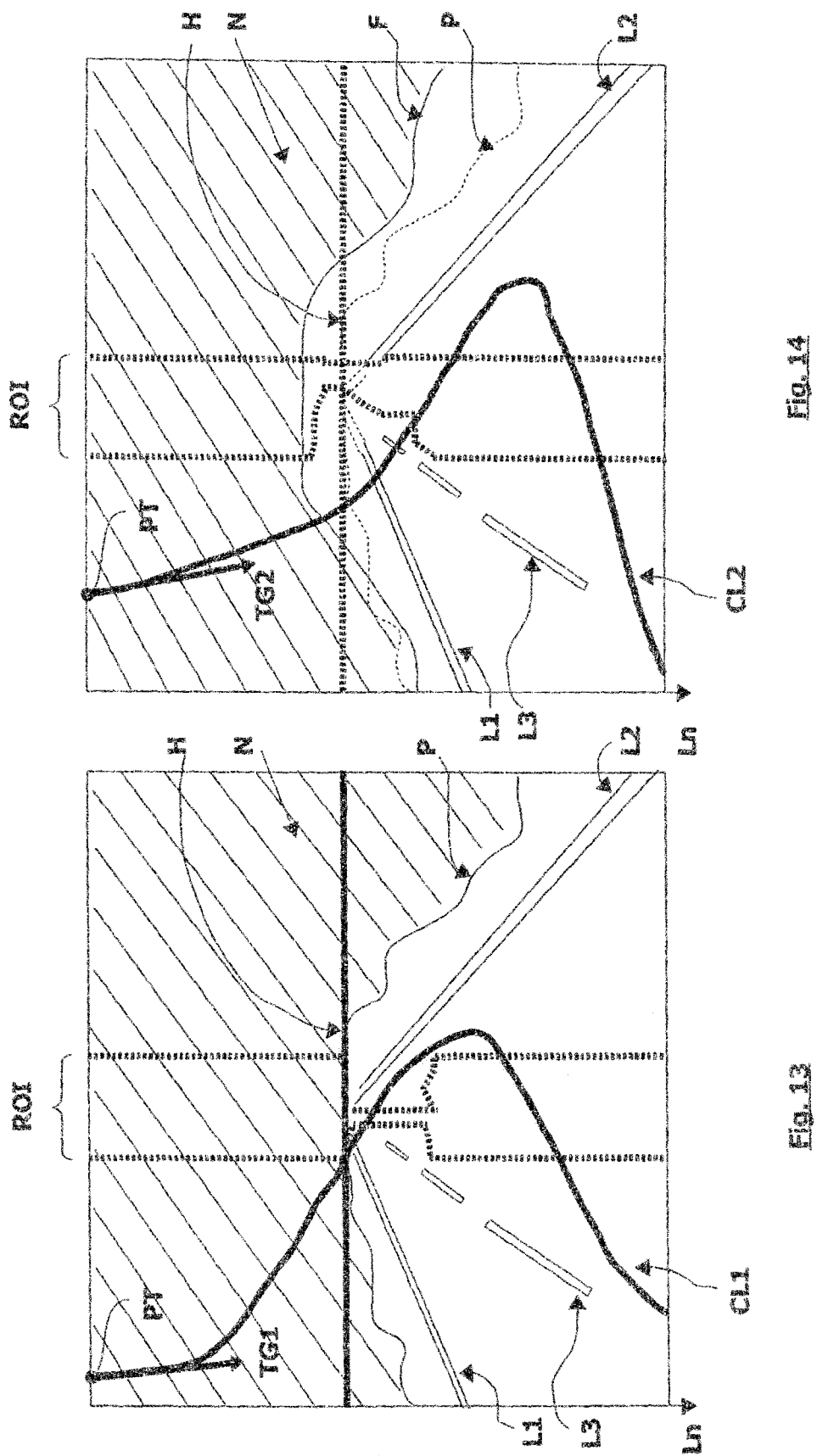

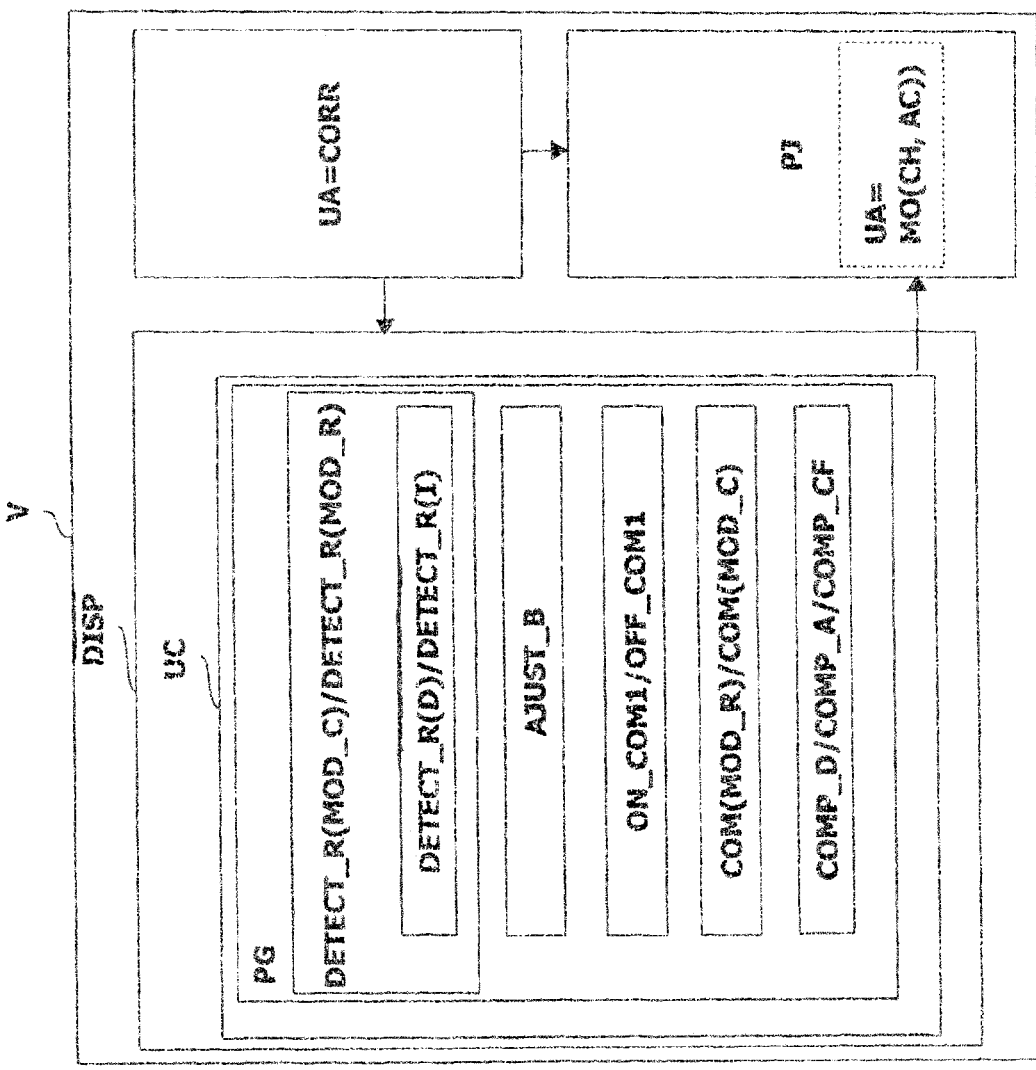

SWITCHING PROCEDURE OF THE MOTOR VEHICLE HEADLIGHT LIGHTING MODE

CROSS-REFERENCE TO RELATED APPLICATIONS

This application claims priority to French Application No. 0807302 filed Dec. 19, 2008, which application is incorporated herein by reference and made a part hereof.

BACKGROUND OF THE INVENTION

1. Field of the Invention

The present invention concerns an automatic switching procedure for headlights, designed to emit a beam of light for motor vehicles from one lighting mode to another lighting mode, and an automatic switching device that enables the commissioning of the procedure.

It is particularly applied in the field of automobiles.

2. Description of the Related Art

In the field of automobiles, a previous state of technology known as an automatic headlight switching procedure for motor vehicles, designed to emit a beam of light from one lighting mode to another lighting mode, makes it possible to automatically switch the headlights of the motor vehicle:
- on the one hand from a low beam position (headlights on low beam) to a full beam position (headlights on full beam) when the vehicle is located in an unlit environment and without there being any crossed or followed vehicle in front (first switching);
- and on the other hand from a full beam position to a low beam position when there exists a phenomenon of visibility disturbance such as fog (second switching) or again when the vehicle is located in a lit environment, with or without the presence of a phenomenon of visibility disturbance, or again when there is a crossed or followed vehicle in front, whether or not a phenomenon of visibility disturbance is present. If a phenomenon of visibility disturbance is present, the phenomenon of visibility disturbance is detected, and switching takes place, on the basis of a backscatter phenomenon of the headlight beam which results from the combination of the lighting of the headlights and the phenomenon of visibility disturbance. If the backscatter is too great, then switching takes place.

This avoids the vehicle driver being disturbed by this backscatter phenomenon. Thus, thanks to this second switching, the backscatter phenomenon is attenuated, indeed annulled, so that the driver is no longer disturbed and therefore does not lose any road visibility. Furthermore, alongside this second switching, the first switching is prohibited. It will be authorized once visibility conditions have improved.

One disadvantage of this previous state of technology is that in the lighting mode in low beam position, with a low, indeed non-existent backscatter phenomenon, it is more difficult to detect the phenomenon of visibility disturbance than in full beam position. Also, when the phenomenon of visibility disturbance is attenuated or disappears, that is, when visibility conditions improve, such a procedure does not allow it to be detected and the first switching is not reactivated. The headlights remain on low beam position, while according to circumstances it could be necessary to return to full beam position.

There is, therefore, a need to provide an improved switching procedure and device.

SUMMARY OF THE INVENTION

The aim of the present invention is to achieve an automatic headlight switching procedure, designed to emit a beam of light for motor vehicles, from one lighting mode to another lighting mode, which makes it possible to reactivate the switching to full beam position of the lighting mode of the headlights, as soon as the phenomenon of visibility disturbance lessens, indeed disappears completely.

According to a first object of the invention, this aim is achieved by an automatic headlight switching procedure for motor vehicles, designed to emit a beam of light from one lighting mode to another lighting mode, wherein the procedure comprises the following steps:
- when the headlights are in a first lighting mode, detecting backscatter of the headlight beam onto a phenomenon of visibility disturbance;
- increasing the lighting range of the headlight beam in relation to a maximum authorized range in accordance with the detected backscatter; and
- switching the headlights to a second lighting mode once the backscatter reaches a first determined threshold.

As one will see in detail below, the fact of increasing the lighting range of the headlight beam in relation to a maximum authorized position improves the lighting of the phenomenon of visibility disturbance in such a way as to enable the backscatter to be measured. If the latter is attenuated, indeed has disappeared, the headlights may be switched back to full beam position. Thus one may reactivate the switching device from low beam position to full beam position.

According to one mode of realization without limitation, the procedure also presents the following characteristics:

The first threshold is determined in such a way that the visibility in the second lighting mode exceeds the visibility in the first lighting mode. In fact, the objective of this invention is to be able to optimize the driver's visibility. Thus, by switching to the second lighting mode one must be able to increase the driver's visibility and not decrease it.

In a first mode of realization, without limitation, the backscatter detection step consists of measuring a visibility distance. This makes it possible to detect the backscatter more precisely.

According to this first mode, the lighting range is increased in accordance with the detected backscatter, in such a way as to be able to measure the visibility distance up to a first visibility threshold, if the measured visibility distance exceeds a second visibility threshold. One can then check if the visibility distance is improved. If it is improved, this means that the phenomenon of visibility disturbance is attenuated, indeed has disappeared, therefore the headlights may be switched back to full beam position. Thus the switching device can be reactivated from low beam position to full beam position.

In a second mode of realization, without limitation, the backscatter detection step is carried out by analyzing a curve of greyness levels obtained from an acquired image from the environment of the motor vehicle. This analysis is simple to carry out, and will therefore only require low calculation power.

In a first variant of this second mode, without limitation, the analysis of the curve of greyness levels involves determining an area within the curve and detecting backscatter in accordance with at least one first surface threshold value within the area. This measurement makes it possible to follow the backscatter phenomenon simply, without requiring any high calculation power.

According to this first variant, the lighting range in accordance with the detected backscatter is increased in such a way as to be able to measure the area in the curve up to a first surface threshold, if the area reaches a second surface threshold value. This loop of regulation is similarly very simple to commission.

In a second variant of this second mode, without limitation, the analysis of the curve of greyness levels involves determining at least one tangent to the curve and detecting backscatter in accordance with at least one first inclination threshold value of a guiding coefficient of the tangent. The measurement of at least one guiding coefficient of a tangent makes it simple to follow the evolution of the curve of greyness level.

According to this second variant, the lighting range in accordance with the detected backscatter is increased in such a way that a guiding coefficient of at least one tangent within the curve can be measured up to a first inclination threshold if the coefficient reaches a second inclination threshold value. This loop of regulation is similarly very simple to commission.

The procedure also involves a further step of authorizing the automatic switching of the headlights from the first lighting mode to the second lighting mode once the backscatter reaches the first determined threshold. This makes it possible to authorize such a switching when there is no further risk that the driver of the vehicle may be disturbed by backscatter. Visibility thus becomes less degraded in the second mode than in the first mode.

The lighting range of the headlight beam is increased in levels. This increase is simple to carry out.

The lighting range of the headlight beam is continuously increased. This makes it possible to progressively increase the beam range.

The lighting range of the headlight beam is adjusted in accordance with an obstacle situated in an environment in front of the motor vehicle. This makes it possible not to dazzle an obstacle such as a vehicle coming in front of the vehicle in question.

The procedure also involves a further step of switching the headlights to the first lighting mode with a view to reducing backscatter of the headlight beam onto a phenomenon of visibility disturbance once the detected backscatter reaches a third threshold. This third threshold therefore corresponds to the threshold beyond which the driver is disturbed by the backscatter of the headlights onto the phenomenon of visibility disturbance in full beam position.

The procedure also involves a further step of prohibiting the automatic switching of the headlights from the first lighting mode to the second lighting mode once the detected backscatter reaches a third threshold. This avoids placing the driver of a vehicle at risk when the backscatter disturbs the driver.

The headlights are switched to the first lighting mode without increasing the lighting range in relation to the maximum authorized range. This makes it possible to automatically pass from full beam position to a regulated low beam position when the backscatter disturbs the driver.

The headlights are switched to the first lighting mode by increasing the lighting range in relation to the maximum authorized range. This makes it possible to account for cases in which there is a phenomenon of visibility disturbance, but the backscatter is not very great.

The lighting range of the headlight beam is decreased according to the increase of backscatter. This makes it possible to adapt the backscatter to the existing phenomenon of visibility disturbance.

The lighting range is increased by using an elevation angle correction function to detect the headlight beam when the motor vehicle is at a horizontal attitude. This makes it possible to use a function currently used in vehicles.

The lighting range is increased by using an interception function of part of the headlight beam. This gives a great deal of flexibility when increasing the lighting range.

A second object of the invention concerns an automatic headlight switching device designed to emit a beam of light for motor vehicles from one lighting mode to another lighting mode, which features the following:
   a unit of increase of the lighting range of the headlight beam in relation to a maximum authorized range in accordance with the detected backscatter; and
   a control unit in order to:
      detect the backscatter of the headlight beam onto a phenomenon of visibility disturbance, when the headlights are in a first lighting mode; and
      switch the headlights to a second lighting mode once the backscatter reaches a first determined threshold.

According to one mode of realization without limitation, the device also presents the following characteristics:

The control unit also makes it possible to switch the headlights to the first lighting mode with a view to reducing backscatter of the headlight beam onto a phenomenon of visibility disturbance, once the detected backscatter reaches a third threshold.

The unit of increase of the lighting range of the headlight beam involves a motor vehicle attitude corrector, so as to be able to use a device which is already fitted in most vehicles.

The unit of increase of the lighting range of the headlight beam involves an optic module consisting of a mobile cache and a mechanical motor unit to activate the mobile cache, the mobile cache being designed to intercept part of the headlight beam with a view to achieving flexible ranges of the headlight beam, that one wishes to obtain.

The device commissions a procedure according to the present invention.

A third object of the invention concerns a computer program product including one or more sequences of instructions executable by an information processing unit, and the execution of the sequences of instructions enables the procedure to be commissioned according to any of the previous characteristics.

These and other objects and advantages of the invention will be apparent from the following description, the accompanying drawings and the appended claims.

BRIEF DESCRIPTION OF THE ACCOMPANYING DRAWINGS

Other characteristics and advantages of the present invention will be better understood with the aid of the description and drawings, without limitation, among which:

FIG. 8 represents an image of FIG. 6 and an associated curve of greyness levels;

FIG. 9 represents an image of FIG. 7 and an associated curve of greyness levels;

FIG. 12 illustrates a variation in accordance with the time of the area in a curve of greyness levels calculated by the step illustrated in FIG. 5;

FIG. 13 represents an image of FIG. 6 upon which is superimposed the curve of greyness levels of FIG. 8 with a tangent;

FIG. 14 represents an image of FIG. 7 upon which is superimposed the curve of greyness levels of FIG. 9 with a tangent;

FIG. 20 illustrates a mode of realization, without limitation, of a commissioning device of the procedure of FIG. 1.

DETAILED DESCRIPTION OF ILLUSTRATIVE EMBODIMENTS

Figure 1:
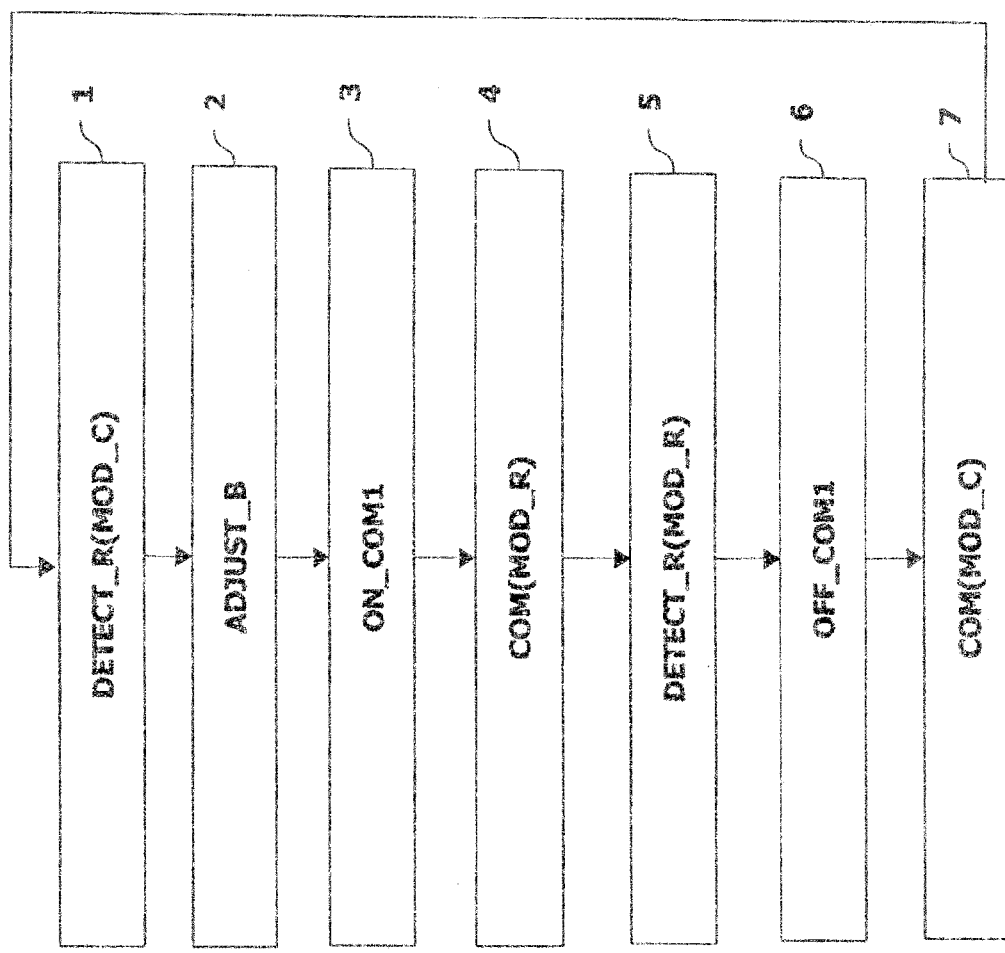
FIG. 1 represents a general flowchart of the switching procedure according to the invention.

The automatic headlight switching procedure or process for motor vehicles, designed to emit a beam of light from one lighting mode to another lighting mode, according to the invention, is described in one mode of realization, without limitation, in FIG. 1.

The word motor vehicle, or automobile, is understood to signify any vehicle with an engine.

The switching procedure involves the following steps as illustrated in FIG. 1:

when the headlights are in a first lighting mode MOD_C, to detect backscatter of the beam of light FX of the headlights PJ onto a phenomenon of visibility disturbance F;

to increase the lighting range B of the beam of light FX of the headlights PJ in relation to a maximum authorized range BM in accordance with the detected backscatter; and to switch the headlights PJ to a second lighting mode MOD_R once the backscatter reaches a first determined threshold T1.

In one mode of realization without limitation, the procedure also involves the further step of authorizing the automatic switching of the headlights from the first lighting mode to the second lighting mode once the backscatter reaches the first determined threshold T1 (step ON_COM1).

In one mode of realization without limitation, the procedure also involves the step of switching the headlights to the first lighting mode MOD_C with a view to reducing backscatter of the beam of light FX of the headlights PJ onto a phenomenon of visibility disturbance F, once the detected backscatter reaches a third visibility threshold T3.

In one mode of realization without limitation, the procedure also involves the further step of prohibiting the automatic switching of the headlights from the first lighting mode to the second lighting mode once the detected backscatter reaches a third visibility threshold T3 (step OFF_COM1).

One will note that the latter two further steps are not necessarily included in the procedure described, but may be part of another procedure executed upstream or downstream of the procedure described.

For further description, in the described mode of realization, without limitation, the procedure includes these two further steps.

The steps of the procedure are described in detail below.

Figure 11:
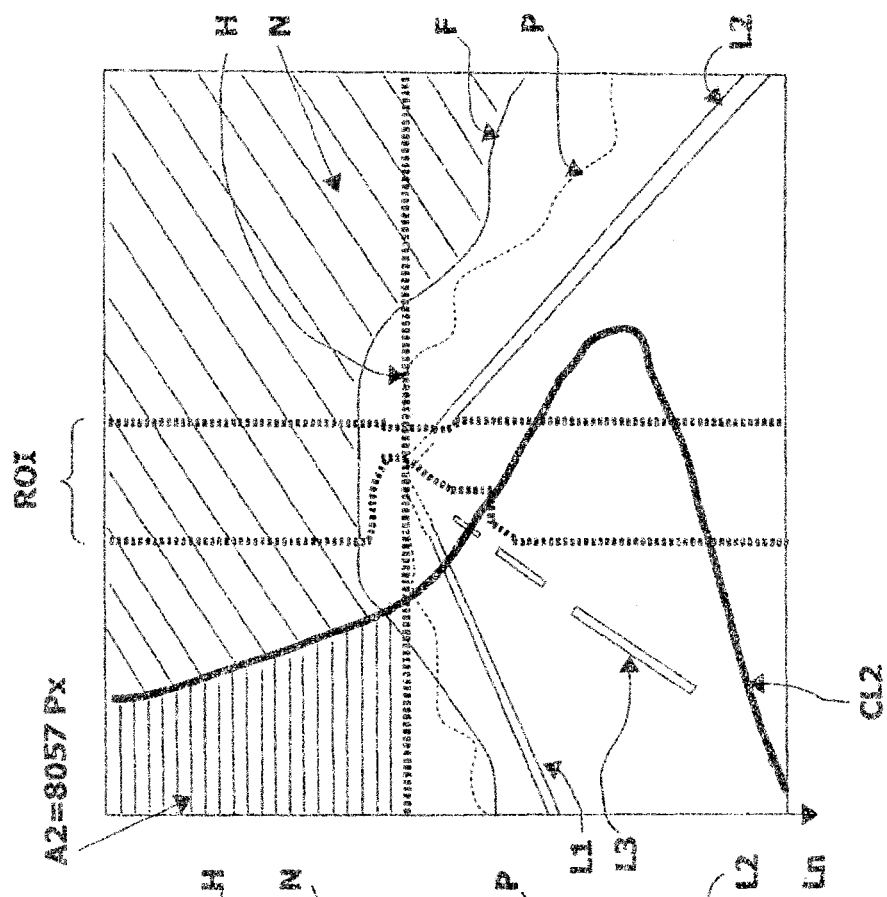
FIG. 11 represents an image of FIG. 7 upon which is superimposed the associated curve of greyness levels of FIG. 9 and an area in this curve of greyness levels.
Figure 10:
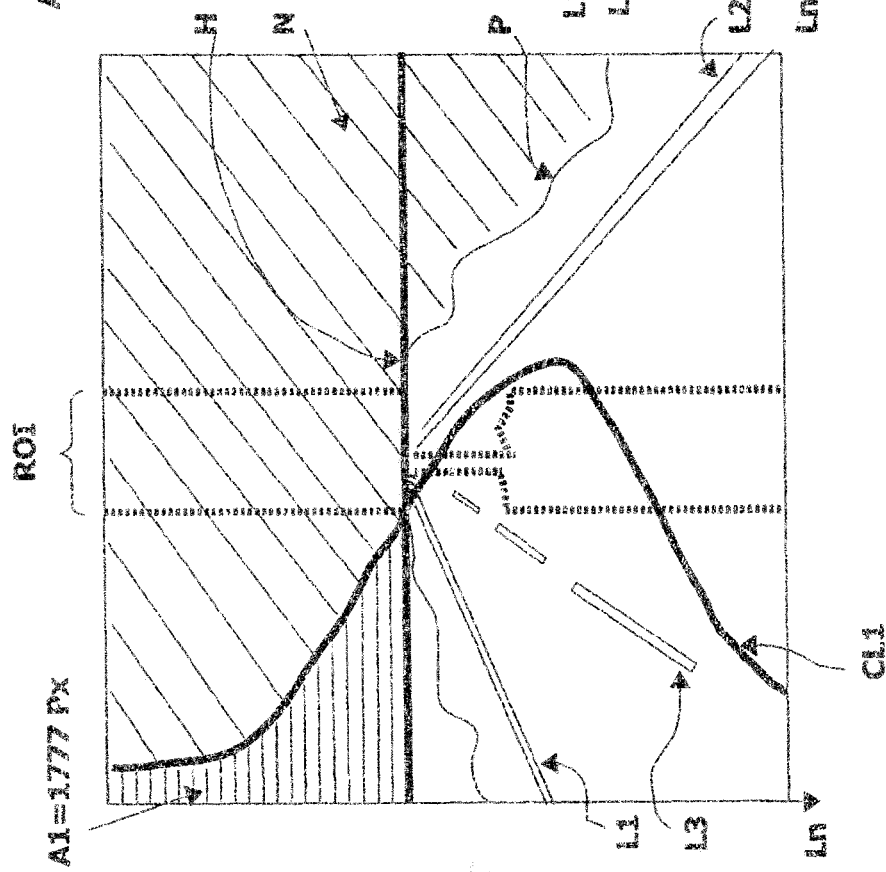
FIG. 10 represents an image of FIG. 6 upon which is superimposed the associated curve of greyness levels of FIG. 8 and an area in this curve of greyness levels.

In a first step 1), when the headlights PJ are in a first lighting mode MOD_C, one detects backscatter of the beam of light FX from the headlights PJ onto a phenomenon of visibility disturbance F (FIGS. 10 and 11).

The phenomenon of visibility disturbance F may be fog, for example.

Obviously, the procedure may be applied to other phenomena that disturb visibility, that is, any phenomenon F which creates an atmospheric disturbance in such a way as to give rise to loss of visibility for a user of vehicle V, such as heavy rain or even spray (known as Gischt in German) generated by vehicles passing in front of vehicle V in question, in one example.

In one example, without limitation, the first lighting mode is the mode in low beam position MOD_C (headlights on low beam).

One will note that when the headlights PJ are in the first lighting mode MOD_C, this means that one is either in a lit environment where a phenomenon of visibility disturbance F may or may not be present, or in an unlit environment where a phenomenon of visibility disturbance F is present, or in an environment where a crossed or followed vehicle is present in front, whether or not a phenomenon of visibility disturbance is present.

For further description, a phenomenon of visibility disturbance F such as fog is taken as an example, without limitation.

First Mode of Realization: Measurement of a Visibility Distance

Figure 2:
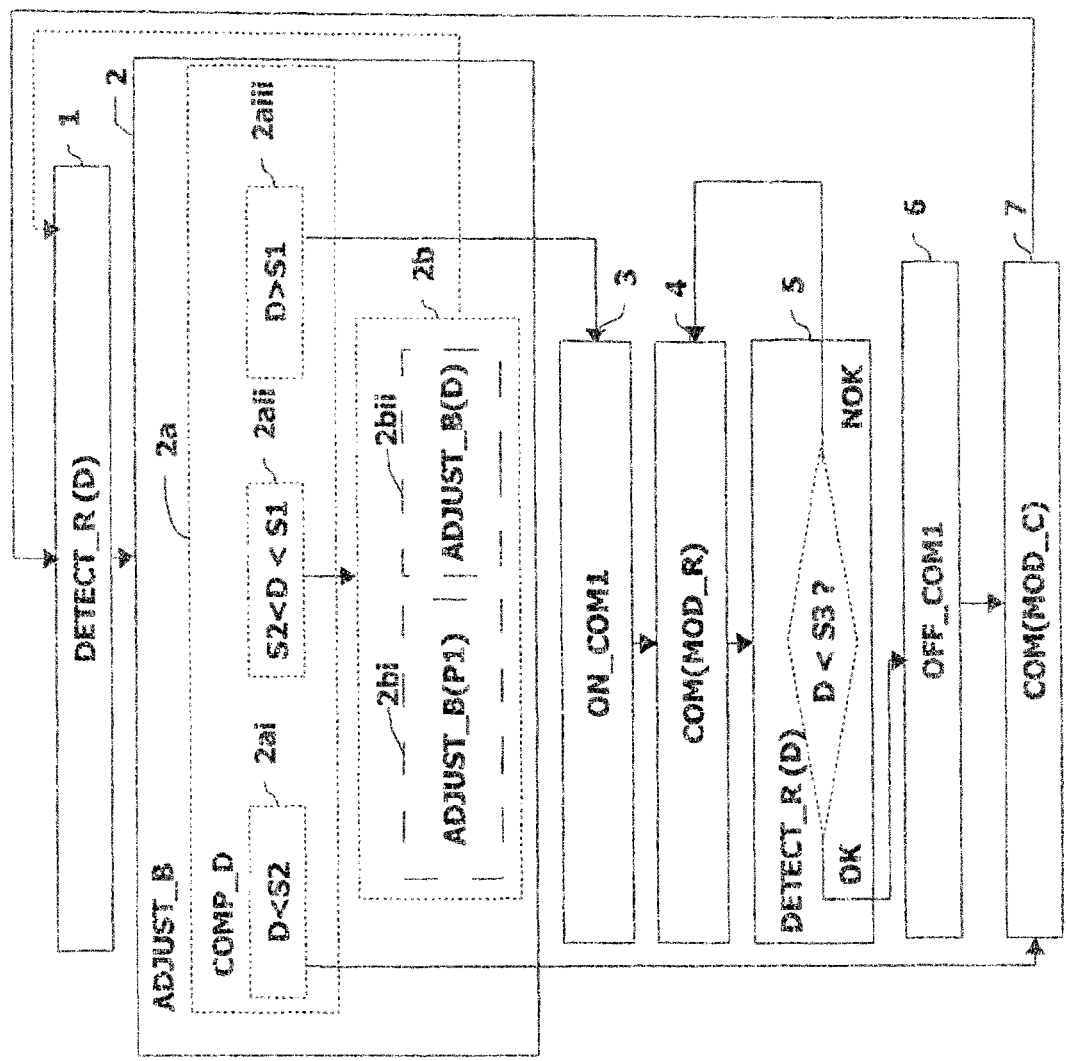
FIG. 2 represents a detailed flowchart of a first mode of realization, without limitation, of the switching procedure of FIG. 1.

In a first mode of realization without limitation, illustrated in FIG. 2, the backscatter detection step is carried out by measuring a visibility distance D (step DETECT_R(D)).

Methods using a video camera or distance sensors such as a lidar, well known by the professional, may be used to measure the visibility distance D.

The measurement of a visibility distance D makes it possible to determine if a phenomenon of visibility disturbance F exists, and if so, its density. It therefore shows the backscatter of the beam of light FX onto the phenomenon of visibility disturbance.

In examples, without limitations, in the case of a phenomenon of visibility disturbance such as fog, when fog F is of:
- low density, the corresponding visibility distance D is over 100 meters (between 100 and 150 meters, for example);
- medium density, the corresponding visibility distance D is between 60 meters and 100 meters; and
- high density, the corresponding visibility distance D is less than 60 meters.

Second Mode of Realization: Analysis of a Curve of Greyness Levels

Figure 3:
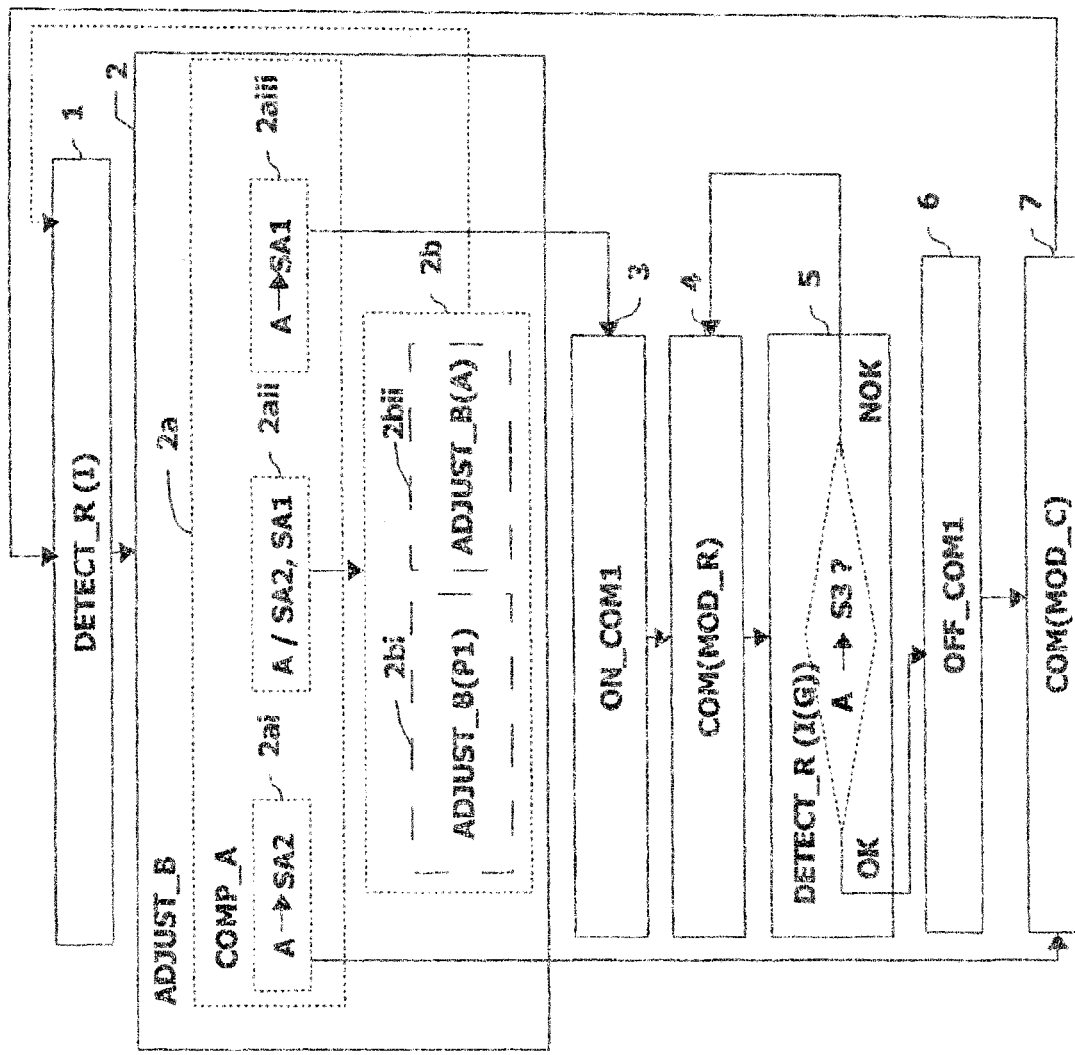
FIG. 3 represents a detailed flowchart of a first variant, without limitation, of a second mode of realization without limitation, of the switching procedure of FIG. 1.
Figure 4:
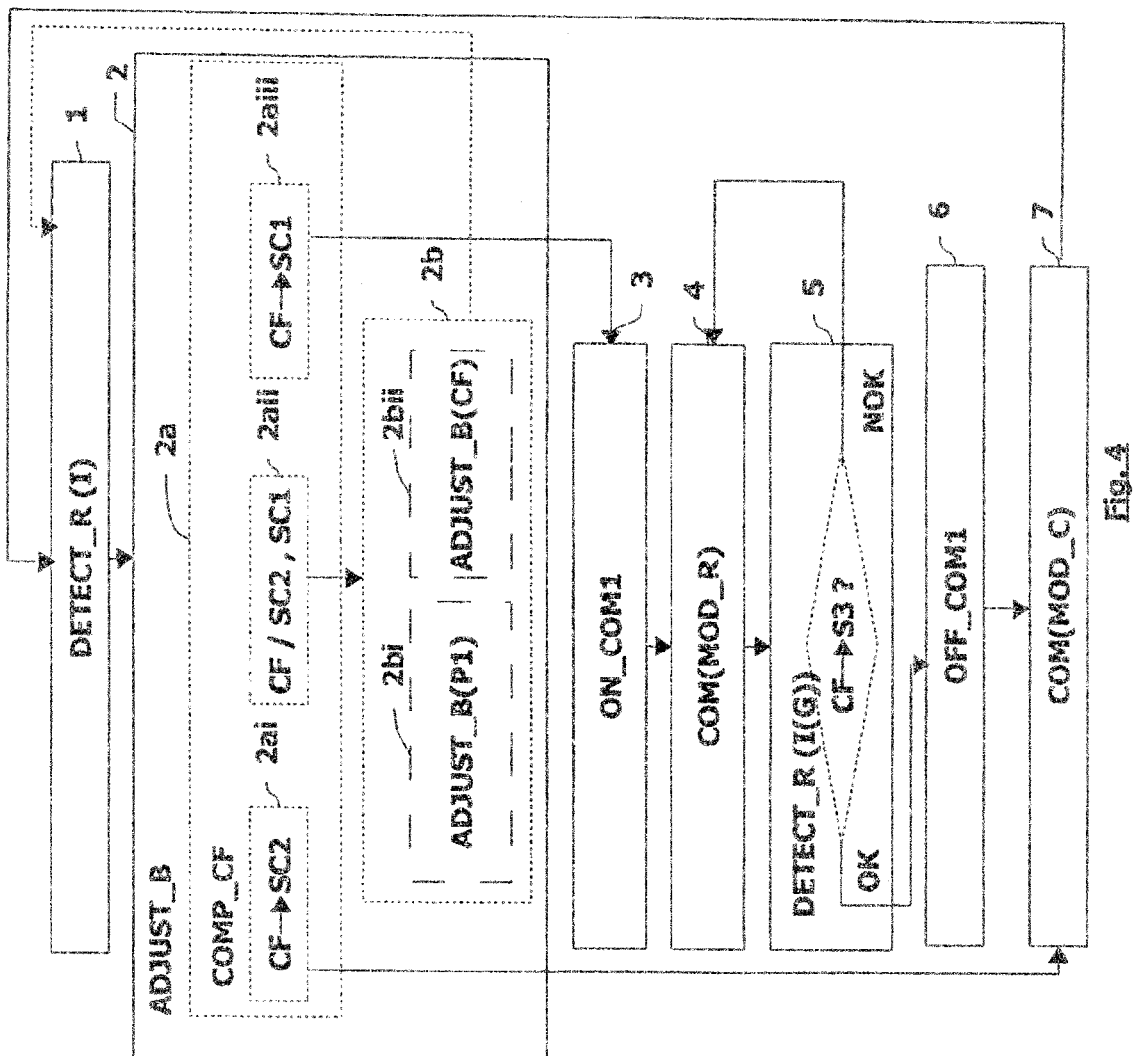
FIG. 4 represents a detailed flowchart of a second variant, without limitation, of a second mode of realization without limitation, of the switching procedure of FIG. 1.

In a second mode of realization, without limitation, illustrated in FIGS. 3 and 4, the backscatter detection step is carried out by analyzing a curve of greyness levels obtained from an acquired image I of the environment of the motor vehicle (step DETECT_R(I)).

The analysis of a curve of greyness level involves the following two steps:
- determination of a curve of greyness level;
- analysis of this curve of greyness level.

First Step: Determination of a Curve of Greyness Level

Figure 5:
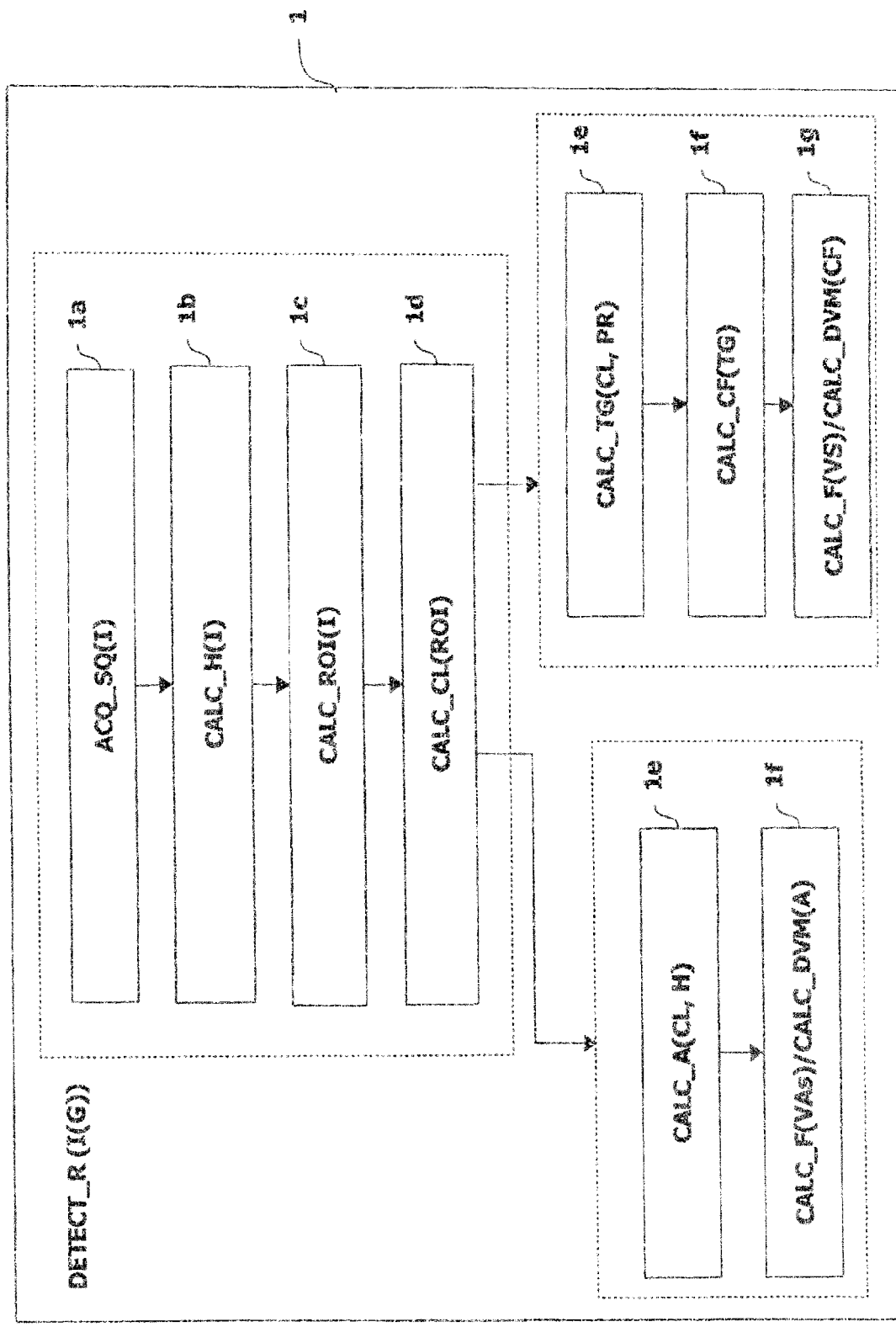
FIG. 5 represents a detailed flowchart of a step of the switching procedure according to FIG. 1.

In one mode of realization without limitation, the determination of a curve of greyness level in order to analyze backscatter, as illustrated in FIG. 5, involves the following sub-steps:
- to acquire at least one image I by a CAM camera (step ACQ_SQ(I)),
- to determine at least one point of interest H in an acquired image I of the environment of vehicle V (step CALC_H (I));
- to determine a region of interest ROI in the image I (step CALC_ROI(I)); and
- to determine a curve of greyness levels CL from the region of interest ROI (step CALC_CL(ROI)).

These sub-steps are described in detail below.

In a first sub-step 1a), one acquires at least one image I from the camera of vehicle V.

As the video CAM camera is placed in front of vehicle V, in the example taken, the acquired image I corresponds to the environment E of vehicle V within the field of the CAM camera and thus in front of vehicle V. One will thus detect a disturbing phenomenon F such as fog in front of vehicle V.

The light from a beam of light FX emitted from one of the headlights PJ is diffused in the presence of particles fog F in suspension in the atmosphere. As the wavelength of this beam of light is compatible with the spectrum of analysis of the CAM camera, and the particles constituting fog F are located within the field of vision of the CAM camera, it is then possible to capture an image integrating the light diffused in fog F.

Figure 7:
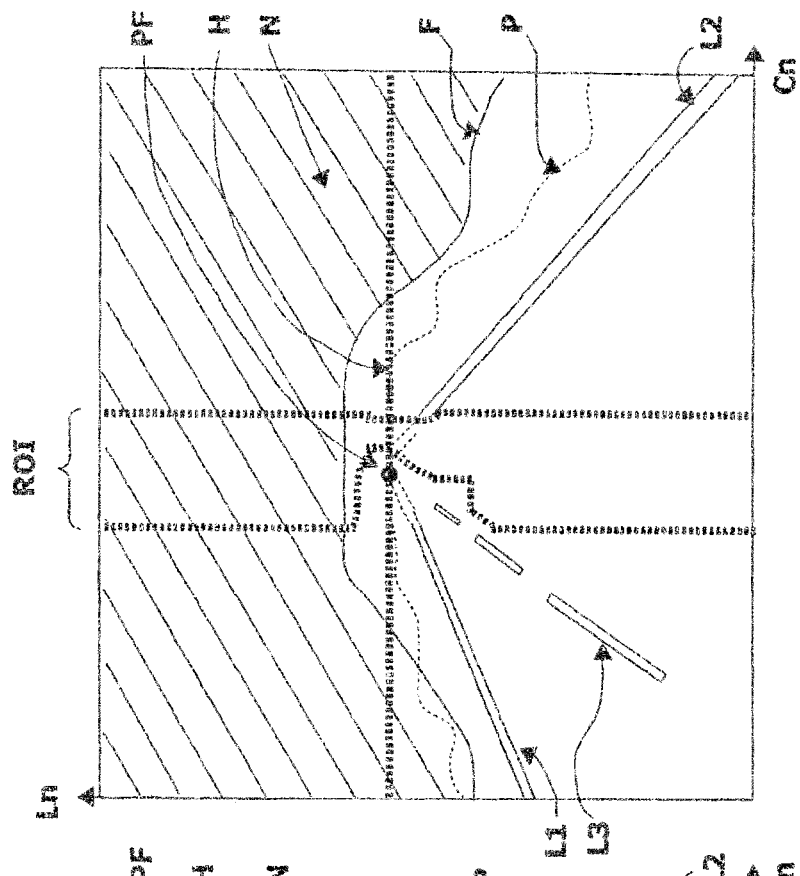
FIG. 7 is a schematic representation of an image of the environment of a vehicle acquired by the step illustrated in FIG. 5 in the presence of fog.
Figure 6:
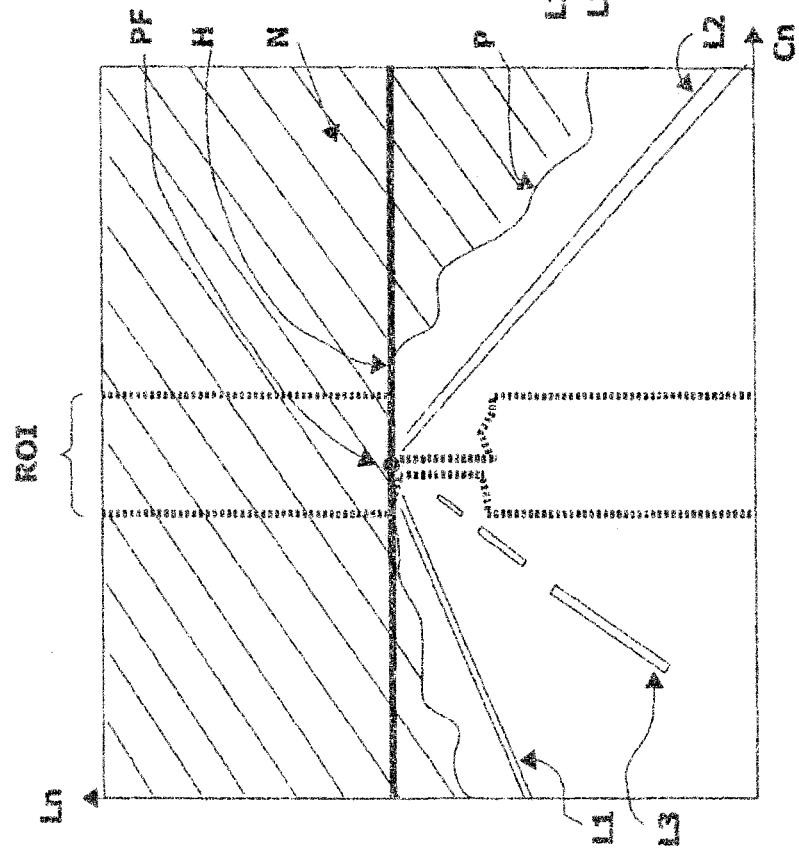
FIG. 6 is a schematic representation of an image of the environment of a vehicle acquired by the step illustrated in FIG. 5 in the absence of fog.

FIG. 6 shows a schematic example of night image I acquired in the absence of fog F, while FIG. 7 shows a schematic example of a night image I acquired in the presence of fog F. The x-axis of an image I represents the columns Cn of this image I, while the y-axis represents the lines Ln of this image I.

These images I give a view of diffused night light with a beam of light FX of headlights PJ.

The white part represents the diffused night light with the beam of light FX, while the part with diagonal hatching, marked N, represents the environment E, now in front of vehicle V, in the field of the CAM camera not lit by the beam of light FX.

The two figures FIG. 6 and FIG. 7 show the following:
- a road on which vehicle V is travelling, represented by the two road marking lines L1 and L2, and that of the middle L3; and
- landscape P bordering the road.

In FIG. 7, landscape P bordering the road is represented by a dotted line as it is veiled by fog F represented in diagram form.

In a second sub-step 1b), one determines at least one point of interest H in an acquired image I of the environment E of vehicle V.

In one mode of realization without limitation, this point of interest stands on the horizon line H in the acquired image I.

In examples without limitations, one may determine the horizon line H from a calculation of point of departure PF in image I arising from the intersection of the path of the white lines L1 and L2 on the road, or again determine it from sensors of attitude.

As the determination of the horizon line H in an image is known by the professional, it is not described in detail here.

One will note that the fact of determining the horizon line H as a point or points of interest, is easy to calculate.

The horizon line H is shown in the two FIGS. 6 and 7.

In FIG. 7, the horizon line H is a dotted line as it is veiled due to fog F.

In a third sub-step 1c), one determines a region of interest ROI in the image I.

In examples without limitations, the region of interest ROI may be:
- a straight vertical line passing through a point of reference PR in image I;
- determined by a surface in the vicinity of a point of reference PR, situated on both sides of the point of reference as illustrated in FIG. 6 and FIG. 7 with dotted lines.

In one mode of realization without limitation, the point of reference PR is the point of departure PF illustrated in FIG. 6 and FIG. 7.

In one variant of this mode, the point of departure PF is centered on the acquired image I. Thus, for an example of image I in 640*480 format, its x-axis PFx stands at 320 pixels, and its y-axis PFy is on the horizon line H. This is where the optical axis of the CAM camera is parallel to the direction of vehicle V.

A region of interest ROI according to the second example of realization is determined as follows, in one mode of realization without limitation:
- in a first step, one determines the contours in image I in such a way as to remove any zones in image I which are not homogenous, with a view to having the same average greyness level. In examples without limitations, edge methods of detection may be used, such as the Sobel, Prewitt, Roberts, Zero-cross, Canny methods etc.;
- in a second step, one determines the region of interest ROI, starting from horizon line H and using an algorithm of growth of the region at the top and bottom of the acquired image I, well known by the professional. One will note that in order to determine the horizon line H, one may, in examples without limitation, determine it from a calculation of point of departure PF in image I arising from the intersection of the path of white lines L1 and L2 on the road, or again determine it from sensors of attitude. As the determination of the horizon line H in an image is known by the professional, it is not described in detail here.

This gives a homogenous region of interest ROI in which the following are excluded:
- noise, parasites; and
- non-homogenous objects such as vehicles, or white lines of the road such as line L3, as illustrated in FIG. 6 and FIG. 7.

In one mode of realization without limitation, in order to have a homogenous ROI even when the road is winding, the region of interest ROI is also determined in the image I in accordance with the angle to the steering wheel α of vehicle V.

In a first variant of realization, without limitation:
the region of interest ROI is centered in relation to the point of reference PR (seen previously) in image I, when the angle to the steering wheel α is zero; and
the region of interest ROI shifts laterally from the point of reference PR in image I, when the angle to the steering wheel α is not zero. In one example, without limitation, the region of interest ROI shifts from the angle to the steering wheel α times three.

Thus, when the angle to the steering wheel α is positive, the region of interest ROI shifts to the right on image I, while when the angle to the steering wheel α is negative, the region of interest ROI shifts to the left on image I. For example, if the angle to the steering wheel α is equal to 10°, the region of interest ROI shifts by 30 pixels to the right from the point of reference PR, and is thus centered on a new point of reference of 320+30 pixels.

In a second variant of realization, without limitation:
the region of interest ROI is centered in relation to the point of reference PR (seen previously) in image I, when the angle to the steering wheel α is below or equal to 15° in absolute value; and
the region of interest ROI shifts laterally from the point of reference PR in image I, when the angle to the steering wheel α is in excess of 15° in absolute value. In one example, without limitation, the region of interest ROI shifts from the angle to the steering wheel α times three. This threshold of 15° is characteristic of a winding road. When the angle to the steering wheel α is below 15° in absolute value, in general, the road is straight, but it is the driver of vehicle V who is not driving straight.

Thus, when the angle to the steering wheel α exceeds +15°, the region of interest ROI shifts to the right on image I (the road direction is to the right), while when the angle to the steering wheel α is below −15°, the region of interest ROI shifts to the left on image I (the road direction is to the left).

For example, if the angle to the steering wheel α is equal to −18°, the region of interest ROI shifts by 54 pixels to left from the point of reference PR, and is thus centered on a new point of reference of 320-54 pixels.

Thus, the fact of determining the position of the region of interest ROI (and more particularly its position in relation to the x-axis as described above) in the acquired image I in accordance with the angle to the steering wheel α, makes it possible to take into account the road direction and thus avoid obstacles such as embankments, trees, etc. situated in front of the vehicle on a winding road. The region of interest ROI is thus more homogenous.

One will note that the second and third sub-steps may be carried out parallel if required.

In a fourth sub-step 1d), one determines a curve of greyness levels CL from the region of interest ROI.

The interest is that the presence of fog F will modify the shape of the curve of greyness levels so that the presence of fog F can be determined by analyzing this curve.

In one mode of realization without limitation, this curve of greyness levels CL is determined as follows. For each line Ln of the acquired image I, one only takes into account the pixels of the region of interest ROI and applies a combination of pixels Px in such a way as to obtain a GR value for each line, and this GR value, for example, is a value of greyness level in the case of a video image (as described hereafter).

In one example of realization without limitation, the combination is the median value of the greyness levels of each pixel Px of the line Ln in question. The advantage of the median is to estimate the average value of the greyness levels while avoiding the noise problems in image I.

A first example of curve of greyness levels CL1 is illustrated in FIG. 8 when there is no fog F, and a second example of curve of greyness levels CL2 is illustrated in FIG. 9 in the case where fog F exists.

As one may see, for a curve of greyness levels CL, the x-axis indicates the number of line Ln in the acquired image I, while the y-axis indicates the attributed value of greyness level GR.

The horizon line H which is found at about the x-axis 220 is also placed on these two curves of greyness levels CL1 and CL2.

One will note that whenever the integration time of the CAM camera is known, a curve of greyness level CL, in one mode of realization without limitations, may be either a curve of luminance or a curve of luminosity.

One recalls that the integration time of the CAM camera corresponds to the time of exposure to light of the sensors of the camera.

Second Step: Analysis of the Curve of Greyness Level

As shown below, the curve of greyness is analyzed out according to two modes of realization, without limitations, according to:
an area A in the curve of greyness levels; or
a guiding coefficient CF of a tangent to the curve of greyness levels.

From this area A or the guiding coefficient, one deduces accordingly the existence of a disturbing phenomenon F and its density, and consequently if there is backscatter of the headlights PJ.

First Mode: in Accordance with an Area A

Thus, in a first mode of realization without limitation, the curve of greyness level is analyzed as follows.

In a fifth sub-step 1e), one determines an area A in the curve of greyness levels CL in accordance with the determined point of interest H (sub-step CALC_A(CL, H) illustrated in FIG. 5).

As one will see, the presence of fog F can be determined by analyzing area A in this curve.

In one mode of realization without limitation, this area A is determined in accordance with horizon line H, the point of interest situated on horizon line H as seen previously.

In a first variant of realization without limitation, this area A is the area corresponding to the top of the acquired image I up to the horizon line H. This is therefore the area situated above the horizon line H.

The advantage of this variant is to obtain a curve of greyness levels of reference CL1 without fog which is independent of parameters such as road infrastructure (type of road surface, humidity rate on the road) etc. Area A1 in the curve of reference thus obtained will therefore be close to a constant without fog, and the curve CL1 thus obtained will therefore be stable (the top of the image is black).

As shown below, when fog F is present, as area A2 in the curve of greyness levels CL2 is different to area A1 of the curve of greyness levels of reference CL1, it will be easy to analyze this curve in relation to the stable curve of reference CL1 to deduce the presence of fog F.

Furthermore, the advantage of this variant is that there is no diffusion of light above the horizon line H, due to the lighting of the headlights in the absence of fog F, as fog F is present, as the diffusion of light is due to the reflection of the beam of light FX of the headlights onto fog F particles. The analysis of the curve of greyness level will highlight this diffusion of light.

One will note that in a second variant of realization without limitation, this area A is the area corresponding to the bottom of the acquired image I up to horizon line H.

As shown in FIGS. 10 and 11, curves of greyness levels CL1 and CL2 associated respectively to images acquired I in the absence of fog F and in the presence of fog F, are superimposed upon the associated images I (they have been swung at 90° in relation to the examples of curves of FIGS. 8 and 9 above).

A first area A1 and a second associated area A2 respectively, at the first curve of greyness levels CL1 and the second curve of greyness levels CL2, are illustrated (horizontal hatches) respectively on these two FIGS. 10 and 11 according to the first variant of realization (top of image).

In a sixth sub-step 1f), one determines the presence of fog F and its density (sub-step CALC_F(VAs) illustrated in FIG. 5).

In a first mode of realization, one determines the presence of fog F and its density in accordance with at least one threshold value VAs of the area A.

In particular, the presence of fog F and its density are determined in accordance with several threshold values VAs which will make it possible to define that:
the vehicle is approaching/leaving a blanket of fog F;
the vehicle is located in fog F
and on the other hand, to define that:
fog F is of low density;
fog F is of medium density;
fog F is of high density.

One will note that the density of fog F is according to a visibility distance DVM.

Thus, when fog F is of:
low density, the corresponding visibility distance DVM is over 100 meters (between 100 and 150 meters for example);
medium density, the corresponding visibility distance DVM is between 60 meters and 100 meters; and
high density, the corresponding visibility distance DVM is less than 60 meters.

FIG. 12 illustrates an example, without limitation, of a variation of area A determined in a curve of greyness levels over time, that is, on a sequence SQ of acquired images I.

In x-axis the time is represented in seconds, and in y-axis the area A is represented in pixels.

At time t0=0, the value of area A corresponds to the absence of fog. One example represents, without limitation, the value VA1 equivalent to 1777 pixels which corresponds to area A1 in the curve of greyness levels of reference CL1 without fog F, represented previously in FIG. 10.

As and when images are acquired, the value of area A changes in accordance with the variations in the atmosphere surrounding the vehicle, and similarly the atmosphere in front of the vehicle, thus in accordance with the presence or otherwise of fog F in which the vehicle is located or will enter.

Thus, it can be seen that between times t0 and t1, the value of area A increases and exceeds a first threshold value VAs1. One deduces accordingly that one enters a zone of fog F at time t1.

Vehicle V is not still located in fog, but detects that it is approaching fog F.

Thus, the progressive variations of area A make it possible to detect that there is a distant blanket of fog which one will enter. One thus anticipates the detection of fog F, thanks to the front camera.

In one example without limitation, the first threshold value VAs1 is equal to 3000. Beyond this value, one estimates that noise is present.

Between times t2 and t3, the value of area A exceeds a second threshold value VAs2 characteristic of fog F.

Vehicle V is thus located in the blanket of fog F.

In one example without limitation, this value VAs stands at around 7000 pixels and corresponds to medium density fog.

The value VA2 equivalent to 8057 pixels, for example, corresponding to area A2 in the curve of greyness levels CL2 with fog F represented previously in FIG. 11 is therefore beyond this second threshold VAs2.

Beyond time t3, the value of area A returns to below the threshold value VAs2 and decreases progressively. One deduces accordingly that one is leaving the zone of fog F A third threshold value VAs3 is used to define that fog F, in which vehicle V is located, is of high density. In one example of realization without limitation, this third threshold value VAs3 is in excess of 9000 pixels.

In a second mode of realization, one determines the presence of fog F and its density in accordance with a visibility distance DVM, the latter being determined in accordance with the area previously determined as A (sub-step CALC_D-VM(A) illustrated in FIG. 5).

In one mode of realization without limitation, when the used area A corresponds to the top of the acquired image I up to horizon line H, the ratio between the visibility distance DVM and the determined area A is equal to:

$$DVM = 275 - A*15/600. \quad [1]$$

One will note that in this case, this ratio [1] does not depend on the type of bitumen, road quality, or any other characteristic of the road, as explained previously.

Obviously, other coefficients may be used.

According to the visibility distance DVM thus calculated, one deduces accordingly the presence of fog F, and its density.

Thus, in one example without limitation, when the visibility distance is below 150 meters, one may deduce accordingly that fog F exists.

Furthermore, as regards density, when the visibility distance is below 60 meters, one may deduce accordingly that fog F is of high density, while when it is in excess of 60 meters, one may deduce accordingly that fog F is of average (60-100 meters) to low (100-150 meters) density.

The calculation of the visibility distance DVM therefore makes it possible to supply information to the driver of vehicle V on the maximum speed Vmax not to be exceeded for safety reasons, and thus guarantee an optimal safety distance. In one example without limitation, one knows that the stopping distance at a speed of 90 km/hr is about 80 meters.

Obviously, one may equally combine these two modes (use of the thresholds VAs and calculation of the visibility distance DVM), either parallel, or one after the other.

After having seen, above, the first mode of realization using area A of a curve of greyness level, the second mode of realization, using a guiding coefficient CF of a tangent, is described below.

Second Mode: in Accordance with a Guiding Coefficient CF

In a second mode of realization without limitation, the curve of greyness level is analyzed as follows, as illustrated in FIGS. 5, 13, 14 and 15.

In a fifth sub-step 1e), one calculates at least one tangent TG from a point of interest PT in the curve of greyness levels CL (sub-step CALC_TG(CL, PR) illustrated in FIG. 5).

In one mode of realization without limitation, the point of interest PT is a point characteristic of a start of diffusion of light above the cut of a beam of light FX emitted by headlights PJ of vehicle V in the presence of fog F.

In fact, in the presence of fog F, the curve of greyness levels CL2 will vary significantly from this point of interest PT in relation to the curve of reference CL1 without fog F.

This is based on the fact that in the absence of fog F, there is no further diffusion of light above the cut of the beam of light FX emitted by the headlights PJ, since fog F is present, this diffusion actually being due to the reflection of the beam of light FX of the headlights PJ on fog F particles. One recalls that the cut of the beam of light FX is in the order of −1% below the horizon line.

In one variant of realization of this mode, the point of interest PT is found above the horizon line H of acquired image I. That makes it possible to be independent of road characteristics (wet ground, wet road etc.) and, generally speaking, the road environment (tree, embankment). In fact, the top of image I located above this line H is less dependent on the road environment.

In one example of this variant, without limitation, the point of interest PT is the origin of the curve. In fact, the point at the origin of the curve of greyness levels CL is found above horizon line H as illustrated in FIG. 14.

The advantage of this example is that there is no further diffusion of light above the horizon line H, due to the lighting of the headlights, in the absence of fog F, since fog F is present as seen previously.

The analysis of the curve of greyness level, and particularly of the guiding coefficient passing through the tangent at this point of interest, will make it possible to highlight this diffusion of light.

In a sixth sub-step 1*f*), one determines the guiding coefficient CF, also known as a slope, from the tangent TG (sub-step CALC_CF(TG) illustrated in FIG. 5).

As shown in detail below, the guiding coefficient CF is characteristic of a change of the environment of the atmosphere around vehicle V. Moreover, a visibility distance DVM may be calculated from this guiding coefficient CF.

Thus, the guiding coefficient CF will make it possible to note the presence of fog F and reduce its density, either directly by means of threshold values, or via the visibility distance DVM as described below.

In a seventh sub-step 1*g*), one determines the presence of fog F and its density.

In a first mode of realization, one determines the presence of fog F and its density in accordance with several threshold values VS of the guiding coefficient CF (sub-step CALC_F (VS) illustrated in FIG. 5).

As one will see, the presence of fog F and its density can be determined by analyzing the guiding coefficient CF.

More particularly, the presence of fog is determined in accordance with a threshold value VS. For example, this value is 0.15 for the example, without limitation, of headlights in low beam position.

In fact, when fog F exists, one may remark that the guiding coefficient CF of the tangent TG of the curve of greyness levels CL has a significant gradient (FIG. 9) in relation to that where fog F is absent (FIG. 8).

Thus, as regards the presence of fog F, when the guiding coefficient CF is above or equal to a first threshold VS1, one deduces accordingly the presence of fog F. In one mode of realization without limitation, this first threshold VS1 is equal to 0.15.

Below this threshold, fog F is not perceptible in image I.

Moreover, one may equally remark that when there is fog, the more fog F is dense, the more the guiding coefficient CF increases.

One will thus also be able determine the density of fog F by means of the guiding coefficient CF.

One uses two other thresholds VS2 and VS3 to this effect, each corresponding to a medium and high density of fog F, respectively.

In one mode of realization without limitation:
the first threshold VS1=0.15 (between this threshold and the second threshold VS2, one deduces accordingly that the fog is slightly dense);
the second threshold VS2=0.46 (between this threshold and the third threshold VS3, one deduces accordingly that the fog is of average density); and
the third threshold VS3=0.77 (beyond this threshold, one deduces accordingly that the fog is very dense).

One will note that the density of fog F is according to a visibility distance DVM.

Thus, when fog F is of:
low density, the corresponding visibility distance DVM is beyond 100 meters (between 100 and 150 meters for example);
medium density, the corresponding visibility distance DVM is between 60 meters and 100 meters; and
high density, the corresponding visibility distance DVM is less than 60 meters.

In a second mode of realization, one determines the presence of fog F and its density in accordance with a visibility distance DVM, the latter being determined in accordance with the guiding coefficient CF (sub-step CALC_DVM(CF) illustrated in FIG. 5).

In one mode of realization without limitation, the ratio between the visibility distance DVM and the guiding coefficient CF is equal to:

$$DVM=61.5-75*CF \quad [1]$$

One will note that in this case, this ratio [1] does not depend on the type of bitumen, road quality, or any other road characteristic as described previously.

Moreover, this ratio [1] is independent of the pitching of vehicle V (pitching due to braking or acceleration), as it does not depend on the horizon line H.

In fact, when such a pitching exists, the determined point of interest PT is only translated into the acquired image I in relation to the previous image without pitching, (upwards when the vehicle brakes, and downwards when the vehicle accelerates).

There is therefore no need to take this pitching into account in the calculation of the visibility distance DVM.

Obviously, other coefficients may be used.

Figure 15:
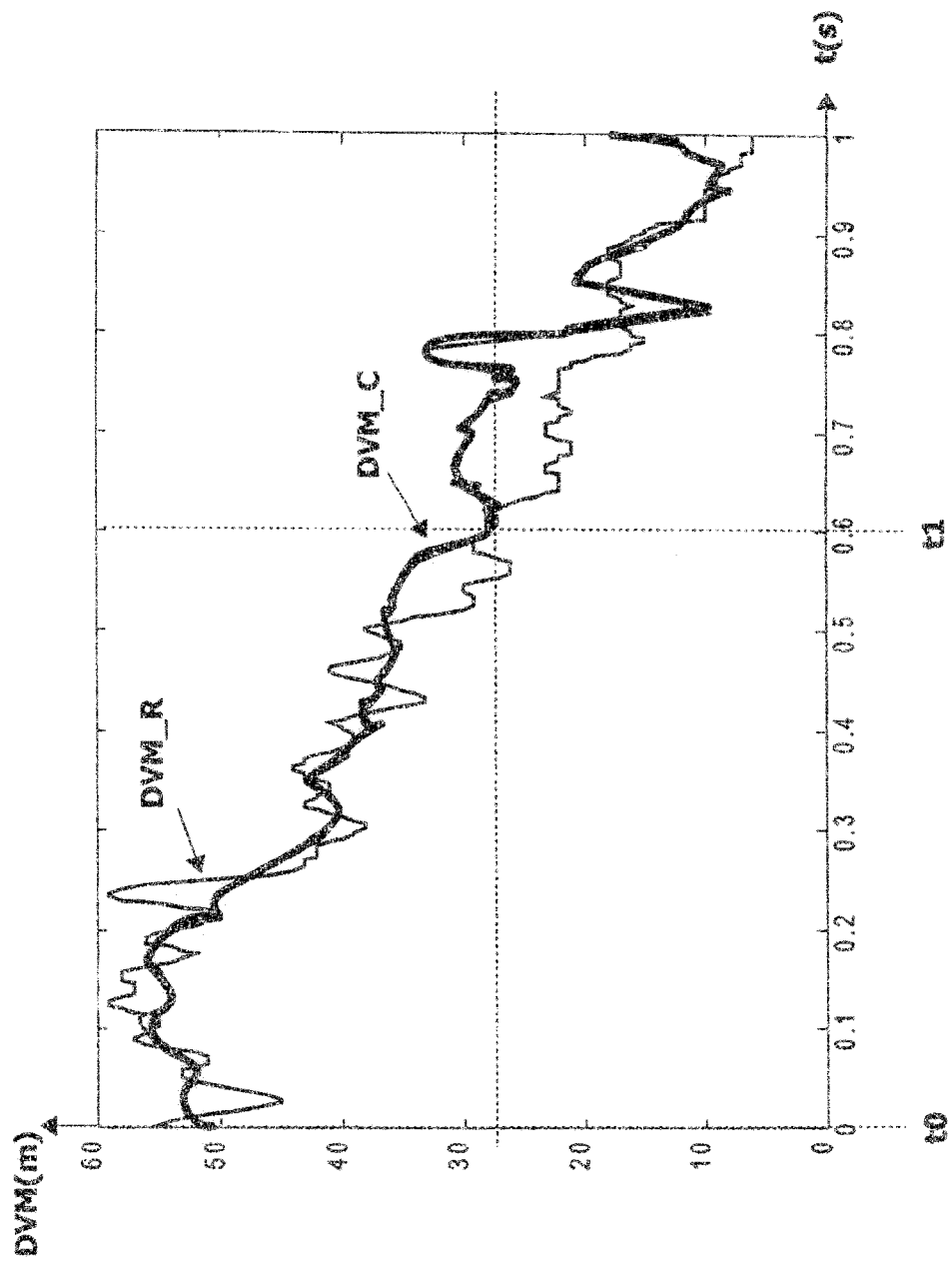
FIG. 15 illustrates a variation in accordance with the time of a visibility distance in accordance with a guiding coefficient of a tangent arising from a curve of greyness levels as illustrated in FIG. 14, and of a visibility distance in accordance with empirical data acquired.

FIG. 15 illustrates an example, without limitation, of variations of the visibility distance DVM (in y-axis in meters) in accordance with the time (in x-axis in seconds).

The first curve DVM_R concerns empirical data of the visibility distance which have been detected over time during real tests.

The second curve DVM_C concerns the visibility distance DVM calculated according to the ratio [1] over time.

One remarks that the second curve DVM_C is very close to the first curve DVM_R. Thus, the calculation of the visibility distance in accordance with the guiding coefficient CF according to the ratio [1] is a reliable indicator which makes it possible to give low values of the visibility distance DVM in relation to the real visibility distance.

Furthermore, as can be seen, the visibility distance DVM decreases over time. One thus enters a blanket of fog of low density at t0=0 (CF=0.15 and DVM=50.25 and fog F becomes dense after about t1=0.6 seconds (CF=0.46 and DVM=27) on average.

According to the visibility distance DVM thus calculated, one may thus equally deduce the presence of fog F and its density.

Thus, in one example without limitation, when the visibility distance is below 150 meters, one may deduce accordingly that fog F exists.

Furthermore, as regards density, when the visibility distance is below 60 meters, one may deduce accordingly that fog F is of high density, while when it is in excess of 60 meters and beyond, one may deduce accordingly that fog F is of average (60-100 meters) to low (100-150 meters) density.

Moreover, the calculation of the visibility distance DVM makes it possible to supply the driver of vehicle V with information on the maximum speed Vmax not to be exceeded for safety reasons, and thus guarantee an optimal safety distance. In one example without limitation, one knows that the stopping distance at a speed of 90 km/hr is about 80 meters.

Obviously, one may also combine these two modes of realization (using the VS thresholds and calculating the visibility distance DVM) in order to refine the detection of fog F and calculate its density, either parallel, or one after the other.

Obviously, other modes of realization may be carried out to detect backscatter onto a phenomenon of visibility disturbance.

In a second step 2), one increases the lighting range B of the beam of light FX in relation to a maximum authorized range BM in accordance with the detected backscatter.

One will note that the maximum authorized range BM corresponds to the statutory lighting authorized for headlights in low beam position, and is defined in European lighting regulations for headlights (Directive 97/28/EC of the Commission of 11 Jun. 1997).

The increase of the lighting range is described below in greater detail according to three modes of realization, without limitations: in accordance with the first mode of realization and the two variants of the second mode of realization of backscatter detection described previously in the first step, that is:

measurement of visibility distance;
analysis of a curve of greyness level in accordance with the area; and
analysis of a curve of greyness level in accordance with the guiding coefficient.

First Mode of Realization

Thus, according to this mode, one increases the lighting range B of the beam of light FX in relation to a maximum authorized range BM of headlights PJ in such a way as to be able to measure the visibility distance D up to a first visibility threshold S1, if the visibility distance D is in excess of a second visibility threshold S2.

One will note that when the backscatter decreases, the visibility distance D increases.

The second visibility threshold S2 is defined in such a way as to guarantee that the increase of lighting range B is sufficient to measure the visibility distance D up to the first visibility threshold S1.

This is the threshold that corresponds to a modification of the lighting mode of the headlights PJ.

As one will see hereafter, when the visibility distance D passes below the second visibility threshold S2, the range corresponds to that of the regulated positions. Above this, the range must be regulated in order to optimize the backscatter which may disturb the driver, and equally allow the measurement of the visibility distance.

In fact, as soon as the visibility distance D exceeds this second visibility threshold S2, the increase of lighting range B of the headlights PJ is released, and lasts for as long as the visibility distance D is below the first visibility threshold S1. This first visibility threshold S1 is the automatic switching threshold of the low beam position, with increased range in full beam position, as shown below.

In one example without limitation, this first visibility threshold S1 is equal to 70 meters. S2 is equal to 40 meters.

In another example without limitation, the first visibility threshold S1 is equal to 100 meters. S2 is equal to 50 meters.

In a first variant of realization without limitation, the lighting range B is increased in levels (step ADJUST_B(P1) in FIG. 2).

Figure 16:
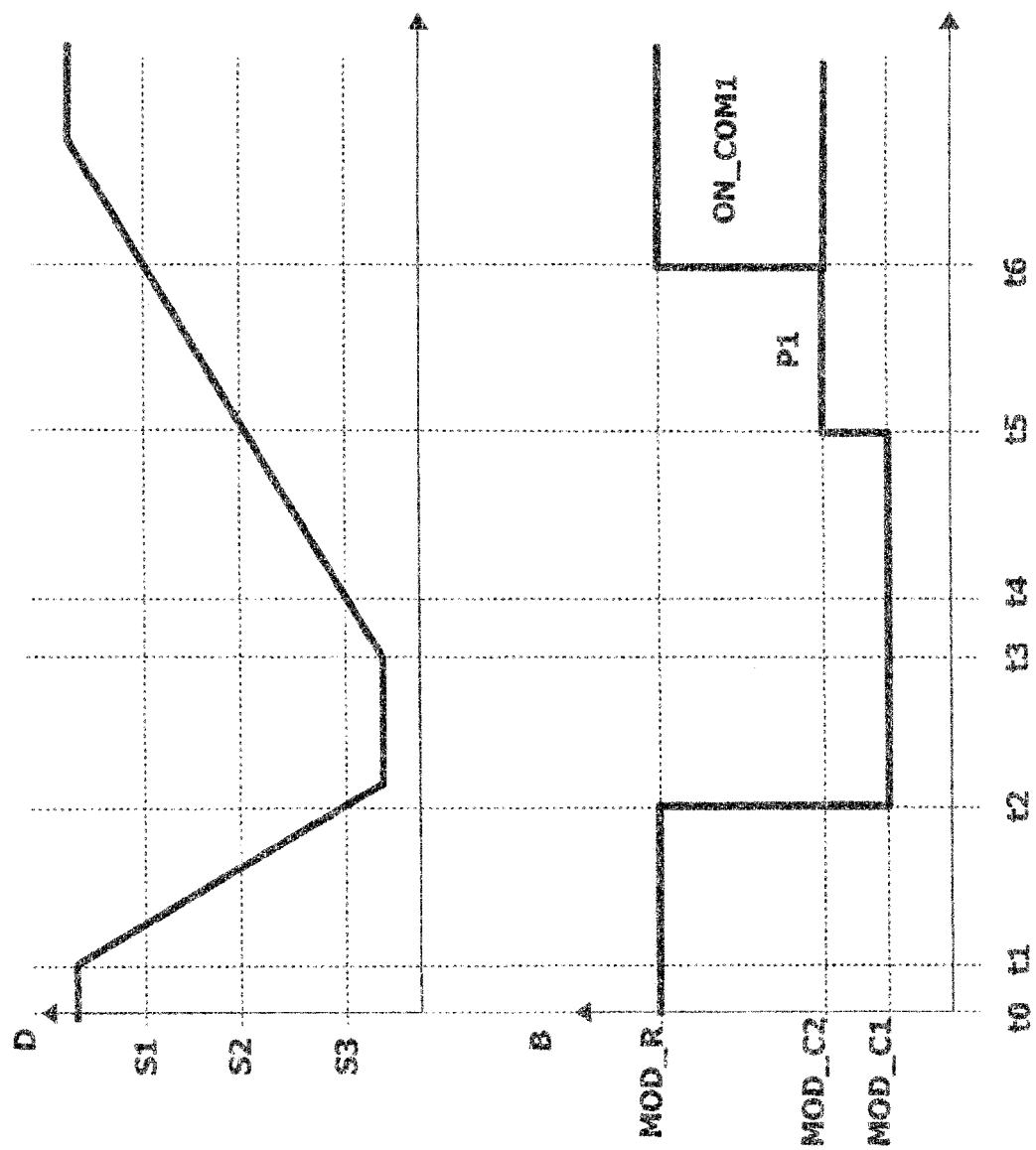
FIG. 16 represents a diagram of a first example, without limitation, of switching motor vehicle headlights with an increase of the lighting range of the headlights according to the switching procedure of FIG. 1.

As shown on the example given in the diagram of FIG. 16:
between times t2 and t5, the headlights are in low beam position without increased range MOD_C1, that is, with the maximum authorized range BM. Further on in the description, this low beam position without increased range will also be referred to as a regulated position;
at time t5, when the visibility distance D exceeds the second visibility threshold S2, the range is increased by a first level P1. In one example without limitation, the second visibility threshold S2 is equal to 50 meters.

This first level P1 is defined in such a way as to make it possible to measure the visibility distance up to the first visibility threshold S1. The headlights PJ are always in low beam position but with an increased range MOD_C2.

One will note that one may obviously use a higher number of levels, each allowing a greater measurement of visibility distance, the last level allowing a measurement up to the first visibility threshold S1.

In a second variant of realization without limitation, the lighting range B of the beam of light FX of the headlights PJ is increased continuously, and in one example without limitation, in accordance with the visibility distance D measured (step ADJUST_B(D) of FIG. 2).

Figure 17:
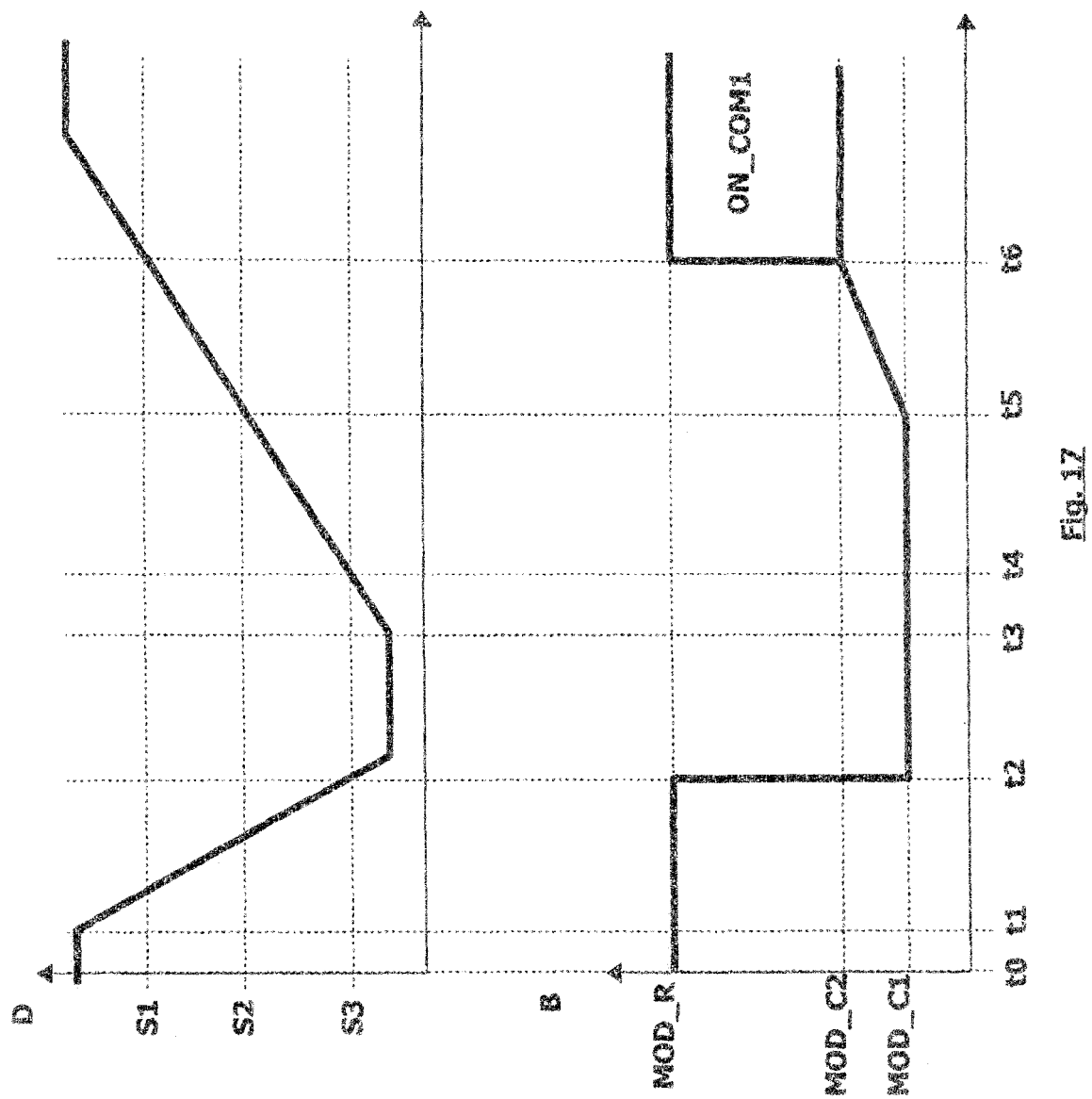
FIG. 17 represents a diagram of a second example, without limitation, of switching motor vehicle headlights with an increase of the lighting range of the headlights according to the switching procedure of FIG. 1.

As shown in the example given in the diagram of FIG. 17:
between times t2 and t5, the headlights are in low beam position without increased range MOD_C1, that is, with the maximum authorized range BM;
at time t5, when the visibility distance D exceeds the second visibility threshold S2, as and when the visibility distance D increases, the lighting range B is increased in linear fashion so as to achieve the increased range MOD_C2 once the visibility distance reaches the value of the first visibility threshold S1.

In one example without limitation, the second visibility threshold S2 is equal to 50 meters.

Thus, the lighting range B is increased progressively in so far as the visibility distance D stands below the first visibility threshold S1. The headlights PJ are always in low beam position but with an increased range MOD_C2.

This has the advantage of being less disturbing for the driver and easier on the eye of the driver (than an all-or-nothing solution in levels where the driver observes oscillations of these lights between the modes of regulated low beam position, increased low beam position, and full beam position).

Figure 18:
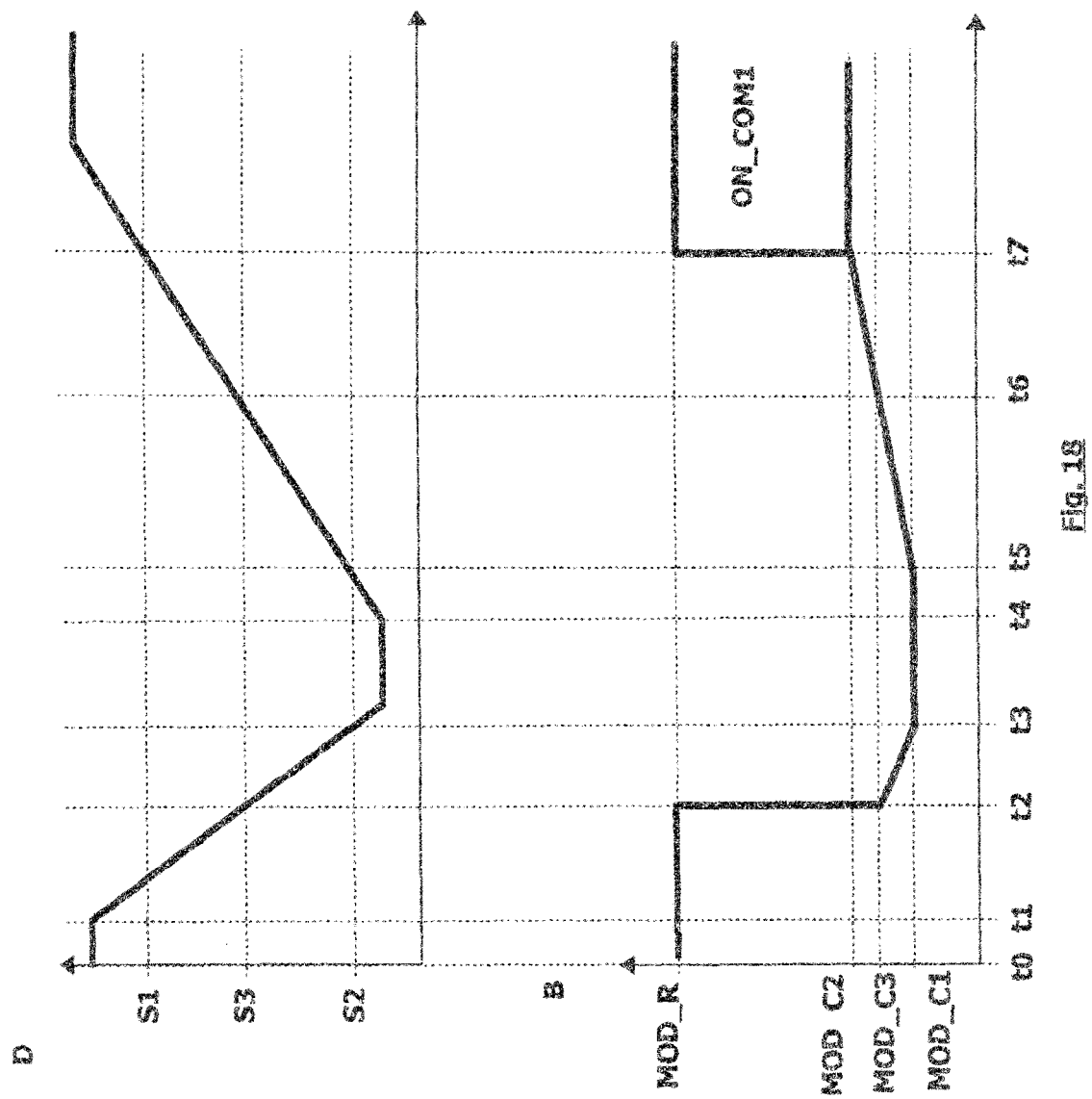
FIG. 18 represents a diagram of a third example, without limitation, of switching motor vehicle headlights with an increase of the lighting range of the headlights according to the switching procedure of FIG. 1.

The same also applies, of the example of FIG. 18, to time t5.

Thus, as one may see on the flowchart of FIG. 2, the second step 2) involves the following sub-steps:
2a) of comparison of the visibility distance D (step COMP_D) with the second visibility threshold S2 (steps 2ai, 2aii), and the first visibility threshold S1 (steps 2aiii, 2aii); and
2b) of increase of the lighting range B:
2bi) by levels according to the first variant of realization (step ADJUST_B(P1));

2*bii*) progressively in accordance with the measured visibility distance D according to the second variant of realization (step ADJUST_B(D)).

Second Mode of Realization

Thus, according to this mode, one increases the lighting range B of the beam of light FX in relation to a maximum authorized range BM of the headlights PJ in such a way as to be able to measure area A in the curve of greyness levels if area A reaches a second surface threshold value SA2.

One will note that as the backscatter decreases, area A decreases.

The second surface threshold SA2 is defined in such a way as to guarantee that the increase of the lighting range B is sufficient to measure area A.

This is the threshold that corresponds to a modification of the lighting mode of the headlights PJ.

Figure 19:
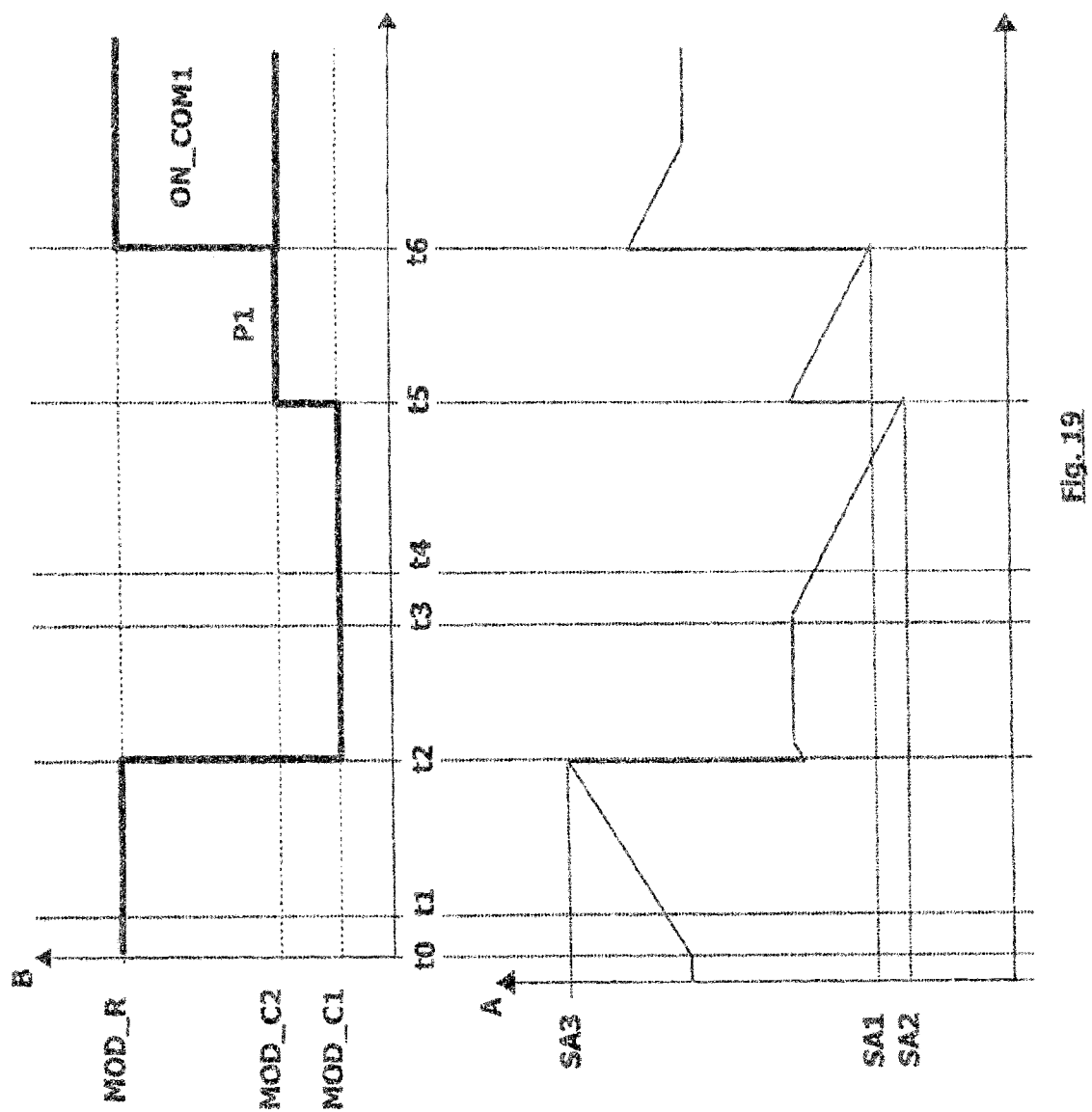
FIG. 19 represents a diagram of a fourth example, without limitation, of switching motor vehicle headlights with an increase of the lighting range of the headlights according to the switching procedure of FIG. 1.

When area A exceeds the second surface threshold SA2, the range corresponds to that of the regulated positions. As soon as area A reaches the second threshold SA2, the range must be regulated in order to optimize the backscatter which may disturb the driver and equally allow area A to be measured, as illustrated in FIG. 19. In the example without limitation, area A has decreased because fog F is attenuated.

In fact, at time t5, as soon as area A reaches this second surface threshold SA2, the increase of the lighting range B of the headlights PJ is implemented, as illustrated in FIG. 19. The lighting range is increased in accordance with the measured area A in such a way as to be able to measure area A up to a first surface threshold SA1 if the area measured before the increase of the lighting range reaches a second surface threshold SA2. This first surface threshold SA1 is the threshold of automatic switching from the low beam position, with increased range, to full beam position.

Furthermore, one will note that the passage from the regulated low beam position MOD_C1 to the low beam position with increased range MOD_C2 will immediately increase the value of the surface, as illustrated in FIG. 19. FIG. 19 shows the evolution of area A of the curve at each moment.

In one example, without limitation, this second surface threshold SA2 is equal to 3000, the first surface threshold SA1 is equal to 4000 and the third to 6000.

In a first variant of realization, without limitation, the lighting range B is increased by levels (step ADJUST_B(P1) in FIG. 3).

In a second variant of realization, without limitation, the lighting range B of the beam of light FX of the headlights PJ is increased continuously, and in one example, without limitation, in accordance with the measured area A (step ADJUST_B(A) of FIG. 3).

Thus, as one may see on the flowchart of FIG. 3, the second step 2) involves the following sub-steps:
  2*a*) of comparison of area A (step COMP_A) with the second surface threshold SA2 (steps 2*ai*, 2*aii*), and the first surface threshold SA1 (steps 2*aiii*, 2*aii*); and
  2*b*) of increase of the lighting range B:
    2*bi*) by levels according to the first variant of realization (step ADJUST_B(P1));
    2*bii*) progressively in accordance with the measured area A according to the second variant of realization (step ADJUST_B(A)).

Third Mode of Realization

Thus, according to this mode, one increases the lighting range B of the beam of light FX in relation to a maximum authorized range BM of the headlights PJ, in such a way as to be able to measure a guiding coefficient CF of at least one tangent in the curve if the coefficient reaches a second inclination threshold value SC2.

One will note that once the backscatter decreases, the guiding coefficient decreases.

The second inclination threshold value SC2 is defined in such a way as to guarantee that the increase of the lighting range B is sufficient to measure the guiding coefficient CF.

This is the threshold that corresponds to a modification of the lighting mode of the headlights PJ.

When the guiding coefficient CF exceeds the second inclination threshold SC2, the range corresponds to that of the regulated positions. As soon as the guiding coefficient CF reaches this second inclination threshold SC2, the range must be regulated in order to optimize the backscatter which may disturb the driver and equally allow the guiding coefficient CF to be measured. The example of FIG. 19 of the second mode described above may be transposed to this third mode.

In fact, as soon as the guiding coefficient CF reaches this second inclination threshold SC2, the increase of the lighting range B of the headlights PJ is released. The lighting range in accordance with the guiding coefficient measured is increased in such a way as to be able to measure the guiding coefficient up to a first inclination threshold SC1 if the measured guiding coefficient before the increase of the lighting range reaches a second threshold SC2. This first inclination threshold SC1 is the automatic switching threshold, from the low beam position with increased range, to full beam position.

In one example without limitation, this second inclination threshold SC2 is equal to 0.3, the first inclination threshold SC1 is equal to 0.5 and the third is equal to 0.95.

In a first variant of realization, without limitation, the lighting range B is increased by levels (step ADJUST_B(P1) in FIG. 4).

In a second variant of realization, without limitation, the lighting range B of the beam of light FX of the headlights PJ is increased, and in one example, without limitation, in accordance with the measured guiding coefficient CF (step ADJUST_B(CF) of FIG. 4).

Thus, as one may see on the flowchart of FIG. 4, the second step 2) involves the following sub-steps:
  2*a*) of comparison of the guiding coefficient CF (step COMP_CF) with the second inclination threshold SC2 (steps 2*ai*, 2*aii*), and the first inclination threshold SC1 (steps 2*aiii*, 2*aii*); and
  2*b*) of increase of the lighting range B:
    2*bi*) by levels according to the first variant of realization (step ADJUST_B(P1));
    2*bii*) progressively in accordance with the guiding coefficient CF measured according to the second variant of realization (step ADJUST_B(CF)).

Furthermore, one will note that in one mode of realization, without limitation, applicable to the three modes of realization described above, the lighting range B of the beam of light FX of the headlights PJ is adjusted in accordance with an obstacle O situated in the environment in front of motor vehicle V in question.

This makes it possible to avoid dazzling a vehicle coming in front (crossed vehicle) of vehicle V in question, or which is followed (followed vehicle) by vehicle V in question.

Thus, when the headlights PJ are in low beam position with increased range MOD_C2, and when there is an obstacle such as a crossed vehicle, either one further progressively decreases the lighting range B of the beam of light FX, or returns to low beam position without increased range MOD_C1.

In one variant, without limitation, the lighting range B is adjusted when increasing the lighting range B of the beam of light FX of the headlights, so that the beam of light FX involves a cutting line which is positioned below a determined axis of an obstacle situated in front of the motor vehicle. In practice, this axis represents the horizontal axis passing across the eyes of a driver of the motor vehicle situated in front of the motor vehicle in question, whether it is a crossed vehicle or a vehicle followed by the motor vehicle in question.

In a third step 3), one authorizes the automatic switching of the headlights PJ from the first lighting mode MOD_C to the second lighting mode MOD_R, once the backscatter reaches the first determined threshold T1 (step ON_COM1 illustrated in FIGS. 1 to 4).

This will then allow an automatic switching of the headlights PJ from the mode of low beam position to the mode of full beam position if the motor vehicle is located in an unlit environment, for example in the country, and without there being any vehicle in front (crossed or followed).

This step is described below according to the three modes of realization, without limitations, described previously at the time of the first step (measurement of visibility distance, area, guiding coefficient).

First Mode of Realization

Thus, according to this first mode, one authorizes the automatic switching of the headlights PJ from the mode of low beam position to the mode of full beam position once the visibility distance D reaches the first visibility threshold S1, and particularly when it exceeds it (step ON_COM1 illustrated in FIG. 2) (and the headlights PJ are in low beam position with increased range).

In this mode, the first visibility threshold S1 is equal to the first determined threshold T1.

As the visibility distance D is above the first visibility threshold S1, there is no longer any risk that the driver of motor vehicle V may be disturbed by backscatter of the beam of light FX of the headlights PJ on fog, if the latter is still present. One may thus authorize switching to full beam position, as this will no longer be disturbing for the driver if it is carried out.

One recalls that the first visibility threshold S1 is the threshold of automatic switching from the low beam position with increased range to full beam position. It is thus the threshold of visibility distance that guarantees that the driver of motor vehicle V will not be disturbed by the backscatter of the fog in full beam position.

As one may see on the examples of FIG. 16 and FIG. 17, at time t6, the visibility distance D reaches and exceeds the first visibility threshold S1. The fog has more or less totally dissipated. At this moment, one authorizes the switching of the lighting mode of the headlights PJ of the motor vehicle from the low beam position MOD_C2 with increased range to full beam position MOD_R (headlights on, or on full beam). The same applies to time t7, for the example of FIG. 18.

Second Mode of Realization

Thus, according to this second mode, one authorizes the automatic switching of the headlights PJ from the mode of low beam position to the mode of full beam position once the measured area A reaches the first surface threshold value SA1 (step ON_COM1 illustrated in FIG. 3) (and the headlights PJ are in low beam position with increased range), as illustrated in FIG. 19.

In this mode, the first surface threshold SA1 is equal to the first determined threshold T1.

Third Mode of Realization

Thus, according to this third mode, one authorizes the automatic switching of the headlights PJ from the mode of low beam position to the mode of full beam position, once the measured guiding coefficient CF reaches the first inclination threshold value SC1 (step ON_COM1 illustrated in FIG. 4) (and the headlights PJ are in low beam position with increased range).

In this mode, the first inclination threshold SC1 is equal to the first determined threshold T1.

The example of FIG. 19 of the second mode described above may be transposed to this third mode.

In a fourth step 4), one switches the headlights PJ to a second lighting mode MOD_R, that is, in the example taken, to the mode of full beam position, once the backscatter reaches a first determined threshold T1.

The first threshold T1 is determined in such a way that the visibility in the second lighting mode MOD_R exceeds the visibility in the first lighting mode MOD_C.

In one mode of realization, without limitation, the full beam position is also activated when the motor vehicle is located in an unlit environment, for example in open countryside, and without there being any crossed or followed vehicle in front.

Methods known by the professional are used to check whether or not the environment of the motor vehicle is lit, as in certain examples, without limitations, of methods that use a camera. The lit environment may be measured either by the intermediary of the time of integration of the camera which exceeds a certain threshold, or by calculating the average value of the image light intensity beyond a certain threshold.

Similarly, methods known by the professional, using a video camera or detection sensors such as a lidar or radar, are used to check if there is a crossed or followed vehicle in front of the motor vehicle in question.

This step is described below according to the three modes of realization, without limitations, described previously at the time of the first step (measurement of visibility distance, area, guiding coefficient).

First Mode of Realization

Thus, according to this mode, one switches the headlights PJ to a second lighting mode MOD_R, that is, in the example taken, to the mode of full beam position, once the visibility distance D reaches the first visibility threshold S1 and in particular when it exceeds it. In this mode, the first visibility threshold S1 is equal to the first determined threshold T1.

On the examples of FIGS. 16 to 18, as one may see at time t6, the headlights PJ are in full beam position MOD_R and the visibility distance D exceeds the first visibility threshold S1.

Second Mode of Realization

Thus, according to this mode, one switches the headlights PJ to a second lighting mode MOD_R, that is, in the example taken, to the mode of full beam position, when the measured area A reaches the first surface threshold SA1, as illustrated in FIG. 19 at time t6. In this mode, the first surface threshold SA1 is equal to the first determined threshold T1.

Third Mode of Realization

Thus, according to this mode, one switches the headlights PJ to a second lighting mode MOD_R, that is, in the example taken, to the mode of full beam position, when the measured guiding coefficient reaches the first inclination threshold SC1. In this mode, the first inclination threshold SC1 is equal to the first determined threshold T1.

The example of FIG. 19 of the second mode described above may be transposed to this third mode.

In a fifth step 5), one detects the backscatter of the beam of light FX of the headlights PJ onto a phenomenon of visibility disturbance (step DETECT_R of FIG. 1) when the headlights are in the second mode MOD_R.

This will enable one to know whether or not a phenomenon of visibility disturbance F is present in this second mode MOD_R. If there is no backscatter, there is no longer any phenomenon of visibility disturbance F.

One will refer to the first step for the different modes of realization, without limitations, making it possible to detect backscatter.

In a sixth step 6), one prohibits the automatic switching of the headlights PJ from the mode of low beam position to the mode of full beam position (step OFF_COM1 illustrated in FIGS. 1 to 4) once the detected backscatter reaches a third threshold T3.

This step is described below according to the three modes of realization, without limitations, described previously at the time of the first step (measurement of visibility distance, area, guiding coefficient).

First Mode of Realization

Once the visibility distance D reaches a third visibility threshold S3, as shown below, the fog provokes a disturbance for the driver which may put him in danger. In these conditions, it is therefore important to inhibit the switching from low to full beam. In fact, otherwise, the headlights PJ would remain in full beam position if no vehicle is located in the environment in front of motor vehicle V, putting the driver in a risk situation, or even forcing him to deactivate the switching himself, which may lead to a disturbance of his driving.

Second Mode of Realization

The same remarks as those described above for the first mode are to be applied here once the measured area A reaches a third surface threshold SA3.

Third Mode of Realization

The same remarks as those described above for the first mode are to be applied here once the measured coefficient CF reaches a third inclination threshold SC3.

In one variant of realization without limitation, applicable to the three modes of realization, this step intervenes parallel to the following seventh step. That is, the prohibition takes place at the same time as the switching to low beam position.

In another variant of realization without limitation, applicable to the three modes of realization, this step intervenes before the seventh step.

One will note that it is preferable not to carry out this step after the seventh step, as otherwise there would be a risk of untimely switching from the mode of low beam position to the mode of full beam position that one wishes to avoid here.

In a seventh step 7), one switches the headlights PJ to the first lighting mode MOD_C with a view to reducing the backscatter of the beam of light FX of headlights PJ onto the phenomenon of visibility disturbance F once the detected backscatter reaches a third threshold T3.

In the example without limitation, the first lighting mode MOD_C is the mode in low beam position. Thus, this avoids a driver of motor vehicle V being disturbed by the backscatter phenomenon resulting from the diffusion of the beam of light FX of headlights PJ onto the phenomenon of visibility disturbance F. One thus attenuates this backscatter phenomenon since the first mode MOD_C lights the phenomenon of visibility disturbance F to a lesser extent.

Thus, not only will the driver not have degraded visibility (one avoids having the driver see less far on full beam than with dipped headlights), but equally the driver will not be at risk of disturbance by too great a quantity of light due to the fact of the backscatter of the beam of light FX.

This third threshold T3 therefore corresponds to the backscatter threshold beyond which the driver of motor vehicle V in question is disturbed by the backscatter onto fog of the headlights in full beam position.

In this case, the headlights are switched automatically from full beam position to low beam position.

In a first variant of realization without limitation, the headlights are switched from the mode of full beam position to the mode of low beam position without increasing the lighting range B in relation to the maximum authorized range BM. This is the regulated low beam position.

In a second variant of realization without limitation, the headlights are switched from the mode of full beam position to the mode of low beam position by increasing the lighting range B in relation to the maximum authorized range BM.

This step is described below according to the three modes of realization, without limitations, described previously at the time of the first step (measurement of visibility distance, area, guiding coefficient).

First Mode of Realization

Thus, according to this first mode, one switches the headlights PJ to the first lighting mode MOD_C with a view to reducing the backscatter of the beam of light FX of headlights PJ onto the phenomenon of visibility disturbance F once the visibility distance D reaches a third visibility threshold S3, particularly when it falls below this third threshold S3.

The third visibility threshold S3 therefore corresponds here to the third threshold T3.

This third visibility threshold S3 therefore corresponds to the threshold of visibility distance below which the driver of motor vehicle V in question is disturbed by backscatter onto the fog of the headlights in full beam position.

The examples of FIGS. 16 and 17 show a switching without increase of range at time t2, while the example of FIG. 18 shows a switching with increase of range at time t2.

Thus, the first variant of realization is illustrated in the examples of FIGS. 16 and 17:

At time t1, the visibility distance D decreases as motor vehicle V progressively enters a blanket of fog, for example.

At time t2, the visibility distance reaches the third visibility threshold S3 and falls below it. The fog becomes more intense. The lighting mode is switched to low beam position MOD_C1 without increasing the range.

At time t3, the visibility distance D resumes its gradual increase. The blanket of fog becomes less dense.

At time t4, the visibility distance D exceeds the third visibility threshold S3. One remains in regulated low beam position MOD_C1, therefore without increasing the range.

Furthermore, the second variant of realization is illustrated in the example of FIG. 18:

At time t1, the visibility distance D decreases as motor vehicle V progressively enters a blanket of fog, for example.

At time t2, the visibility distance reaches the third visibility threshold S3 and falls below it. The fog becomes more intense. The lighting mode is switched to low beam position with an increased range MOD_C3 as the backscatter in this position is not very great.

Between times t2 and t3, the visibility distance D continues to decrease, therefore the backscatter increases. The lighting range B thus decreases as and when the visibility distance D decreases, in order to decrease the backscatter on fog F.

At time t3, the visibility distance D falls below the second visibility threshold S2, which corresponds to a regulated low beam position. The lighting range B is decreased until it reaches the maximum authorized range BM and the headlights PJ are brought to a low beam position without increasing the range MOD_C1.

At time t4, the visibility distance D resumes its gradual increase. The blanket of fog becomes less dense. One remains in regulated low beam position MOD_C1, therefore without increasing the range.

One will remark that in the two first examples of FIGS. 16 and 17, in the first variant of realization, the second visibility threshold S2 is above the third visibility threshold S3, while in the second variant of realization, in the third example of FIG. 18, the second visibility threshold S2 is below the third visibility threshold S3.

The interest of the first variant of realization is to take into account the phenomenon of visibility disturbance F, and thus the backscatter, as soon as it becomes disturbing for the driver of motor vehicle V, in such a way as to adjust the headlights PJ so that they no longer disturb the driver.

In that case, as seen previously, when switching the headlights to the mode of low beam position MOD_C, the lighting range B of the beam of light FX of the headlights is equal to the maximum authorized range BM. There is no increase of range.

Thus, in one example without limitation, if the third visibility threshold S3 is fixed at 40 meters, the second visibility threshold S2 will be above the third visibility threshold S3, and equal to 50 meters.

One will remark that in this example where the third visibility threshold S3 is fixed at 40 meters, if the second visibility threshold S2 was below the third visibility threshold S3 as in the second variant of realization, there would be a switch to low beam position with increase of range, which would be disturbing for the driver, because at the visibility threshold S3 equal to 40 meters, the backscatter of the increased beam of light is too high.

The interest of the second variant of realization is to always be able to detect backscatter in the mode of low beam position.

In that case, as seen previously, when switching the headlights to the mode of low beam position MOD_C, the lighting range B of the beam of light FX of the headlights is increased in relation to the maximum authorized range BM in such a way as to light up to the first visibility threshold S1, and then decreased as and when the visibility distance decreases.

Thus, in one example without limitation, if the third visibility threshold S3 is fixed at 80 meters, the second visibility threshold S2 will be below the third visibility threshold S3, and equal to 50 meters.

One will remark that in this example where the third visibility threshold S3 is fixed at 80 meters, if the second visibility threshold S2 exceeded the third visibility threshold S3 as in the first variant of realization, there would be a switching to low beam position without an increased range, which would hinder detection of the backscatter below, because at the visibility threshold S3 equal to 80 meters, the backscatter of the beam of light is very low.

Second Mode of Realization

Thus, according to this first mode, one switches the headlights PJ to the first lighting mode MOD_C with a view to reducing the backscatter of the beam of light FX of headlights PJ onto the phenomenon of visibility disturbance F, once the measured area A reaches a third surface threshold SA3, as illustrated in FIG. 19 at time t2.

The third surface threshold SA3 therefore corresponds here to the third threshold T3.

This third surface threshold SA3 therefore corresponds to the threshold of the measured area A, beyond which the driver of motor vehicle V in question is disturbed by backscatter onto the fog of the headlights in full beam position.

Third Mode of Realization

Thus, according to this first mode, one switches the headlights PJ to the first lighting mode MOD_C with a view to reducing backscatter of the beam of light FX of headlights PJ onto the phenomenon of visibility disturbance F, once the measured guiding coefficient CF reaches a third inclination threshold SC3.

The third inclination threshold SC3 therefore corresponds here to the third threshold T3.

This third inclination threshold SC3 therefore corresponds to the threshold of the measured guiding coefficient CF above which the driver of motor vehicle V in question is disturbed by backscatter onto the fog of the headlights in full beam position.

The example of FIG. 19 of the second mode described above may be transposed to this third mode.

One will note that in one mode of realization without limitation, applicable to the three modes of realization described above, the lighting range B of the beam of light FX of the headlights is adjusted according to the obstacles O situated in an environment in front of motor vehicle V. This makes it possible to ensure that motor vehicle V in question does not dazzle crossed or followed vehicles, as seen previously. Thus, if one is in a mode of low beam position with increased range, one will decrease the increased range if there is an obstacle O such as a crossed and followed vehicle, and according to the distance at which it is located.

At the end of the seventh step, one then returns to the first step and so on.

Thus, steps 1 to 7 described above are executed in real time, in accordance with the modification of visibility distance D which is due to the presence or otherwise, and variations, of a phenomenon of visibility disturbance F.

Thus, the procedure described makes it possible to switch the headlights of a motor vehicle from one lighting mode to another in accordance with the occurrence or disappearance of the disturbing phenomenon, and its variations.

The procedure of the invention is commissioned by a DISP automatic headlight switching device designed to emit a beam of light FX for motor vehicle V from one lighting mode to another lighting mode, represented in FIG. 20.

This device DISP is integrated in motor vehicle V.

This device DISP particularly involves the following:
a unit of increase UA of the lighting range B of the beam of light FX of headlights PJ in relation to a maximum authorized range BM in accordance with the detected backscatter; and
a control unit UC in order to:
  detect backscatter of the beam of light FX of the headlights PJ onto a phenomenon of visibility disturbance F, when the headlights are in a first lighting mode MOD_C; and
  switch the headlights PJ to a second lighting mode MOD_R once the backscatter reaches a first determined threshold T1.

According to a mode of realization without limitation, the control unit UC also makes it possible to switch the headlights PJ to the first lighting mode MOD_C with a view to reducing backscatter of the beam of light FX of the headlights (PJ) onto a phenomenon of visibility disturbance F, once the detected backscatter reaches a third threshold T3.

In a first mode of realization without limitation, the unit of increase UA of the range of the lighting of the headlights involves a CORR motor vehicle attitude corrector, and the lighting range B in low beam position is increased by using an elevation angle correction function to detect the beam when the motor vehicle is at a horizontal attitude.

In fact, a CORR attitude corrector generally uses an elevation angle correction function, in order to guarantee a range of constant lighting whatever the attitude variations of the motor vehicle. This function consists of raising the beam in situations of braking, and lowering the beam in situations of acceleration, in order to avoid dazzling crossed or followed vehicles.

Thus, by using this function to raise the beam of light FX of headlights PJ when the motor vehicle is at a horizontal attitude, we then increase the lighting range of the low beam.

This first mode makes it possible to use a device (the attitude corrector) which is already fitted in numerous vehicles.

In a second mode of realization without limitation, the unit of increase UA of the range of the lighting of the headlights involves an optic module MO, particularly consisting of a mobile cache CH and a mechanical motor unit AC to activate the mobile cache CH, the mobile cache being particularly designed to intercept part of the beam of light FX emitted by the headlights PJ.

The lighting range B in low beam position is therefore increased by using an interception function on part of the beam of light FX of the headlights.

Thus, this function is based on the use of an optic module MO, well known by the professional, known as a bi-function module designed to function in mode of low beam position (active position of cache CH creating a regulated cutting beam) and in mode of full beam position (retracted position of cache CH) in which several intermediary positions of the mobile cache CH are added to the known positions in such a way as to intercept the emitted beam of light FX to a greater or lesser extent, and thus emit a beam of light FX with different cutting lines.

As an optic bi-function module is known by the professional, it will not be described in further detail here.

This second mode of realization gives flexibility at the level of the desired ranges of the beam of light FX of the headlights.

In fact, the mobile cache CH may take different intermediary positions which make it possible to achieve a very large number of different ranges of the beam of light FX which thus has a different cutting line. Furthermore, the cache CH may be mobile according to different variants which adds other possibilities of intermediary positions, and hence of different cutting lines and ranges. Thus, in examples without limitations, it may be mobile according to a direction significantly perpendicular to the optical axis of the headlights (y-y) or again according to an elliptic direction.

In the case of the second mode of realization, the optic module MO is integrated within each of the headlights of motor vehicle V as illustrated in FIG. 20 in a dotted line.

One will note that the control unit UC also makes it possible to pilot the mechanical motor unit AC. In one mode of realization without limitation, piloting takes place in accordance with the measured visibility distance D, of area A or the guiding coefficient CF.

In one variant of realization, piloting takes place in such a way as to have a beam of light FX which does not dazzle when an obstacle stands in front of motor vehicle V as described previously.

Thus, these two modes of completing the unit of increase UA make it possible to modify the cutting line of the beam of light FX of the headlights to detect the beam in relation to the maximum range BM authorized by European lighting regulations.

One recalls that at statutory level, the regulated cutting line of a beam of light FX of a headlight in low beam position is directed with a slope of between −1% radian and −1.5% radian. For headlights situated at 60 cm from the ground with adjustment to −1% radian, the beam of light FX lights the ground over a distance of about 60 meters in front of the motor vehicle.

In a third mode of realization, one will note that one may equally have a combination of the two modes.

One will note that the stated switching procedure may be commissioned by means of a micro-program 'software' device, wired logic and/or electronic 'hardware' components.

Thus, the DISP switching device may involve a computer program product PG including one or more sequences of instructions executable by an information processing unit such as a microprocessor, or a processing unit of a microcontroller, ASIC, computer etc., and the execution of the sequences of instructions makes it possible to commission the described procedure.

Such a computer program PG may be recorded in non-volatile recordable memory of ROM type, or in non-volatile re-recordable memory of EEPROM or FLASH type. The computer program PG may be recorded in memory in the factory, or even charged with memory or remotely charged with memory. The sequences of instructions may be sequences of machine instructions, or again sequences of a command language interpreted by the processing unit at the time of their execution.

In the example without limitation of FIG. 20, the computer program PG is recorded in a memory of the control unit UC of the DISP device.

Obviously, the description of the procedure is not limited to the modes of realization and examples described above. Thus, the procedure may be applied to a disturbing phenomenon F which, in addition to fog, may be heavy rain or even snow, in examples without limitation.

Thus, the invention particularly presents the following advantages:

It makes it possible to increase the backscatter generated by the beams of light of headlights PJ in low beam position, lighting a phenomenon of visibility disturbance by increasing the lighting range of the beam of light, and thus have sufficient backscatter to be able to detect a phenomenon of visibility disturbance. This gives a maximized lighting range in such a way as to see a desired backscatter.

It makes it possible to again authorize switching from low beam position to full beam position if the backscatter reaches a first determined threshold. Switching to full beam position may then take place if:

motor vehicle V is again located in an unlit environment as there is no further phenomenon of visibility disturbance if any, and if applicable, if no vehicle is located in front of motor vehicle V in question.

It makes it possible to detect a phenomenon of visibility disturbance, either by measuring the visibility distance, or by analyzing the curve of greyness levels.

It makes it possible to economize in modes by not using an additional source such as infrared to measure the visibility distance.

It makes it possible to increase the lighting range of the beam of light either by levels, or progressively.

It makes it possible to adjust the lighting range between the third threshold T3 and the second threshold T2, and thus be able to adjust the backscatter in fog F so as to disturb the driver as little as possible.

It enables optimal driving visibility, thus retaining an optimal range without the backscatter disturbing the driver.

It makes it possible not to dazzle the driver of a crossed or followed vehicle when the lighting range takes into account the obstacles situated in front of motor vehicle V in question.

It brings the driver visual comfort and a sense of security when he drives his vehicle.

It makes it possible to obtain a sufficient degree of visibility, when the headlights are in low beam position, to be able to measure the visibility distance/area/guiding coefficient in this position.

It is based on functions that already exist in the state of technology, to increase the lighting range by using either an automatic attitude correction function generally used for discharge lamps, or a function designed to intercept the beam of light.

It makes it possible to be integrated easily in a module that already uses the automatic switching function from one lighting mode to another standard lighting mode.

It is simple, fast and economical to commission due to the fact of the simple, fast and economic treatment of the different steps.

While the process and product herein described constitute preferred embodiments of this invention, it is to be understood that the invention is not limited to this precise process and product, and that changes may be made therein without departing from the scope of the invention which is defined in the appended claims.

What is claimed is:

1. An automatic headlight switching process designed to emit a beam of light for motor vehicle from one lighting mode to another lighting mode, comprising the following steps:
   when the headlights are in a first lighting mode, detecting backscatter of the beam of light from the headlights onto a phenomenon of visibility disturbance;
   increasing the lighting range of the beam of light from the headlights in relation to a maximum authorized range in accordance with the detected backscatter during said one lighting mode in order improve a lighting of said phenomenon of visibility disturbance to enable the backscatter to be measured;
   measuring a visibility distance of said backscatter in response to said increase in said lighting range of the beam of light;
   switching the headlights from said one lighting mode to a second lighting mode (MOD_R) once the backscatter reaches a first determined threshold.

2. The automatic switching process according to claim 1, wherein the first determined threshold is determined in such a way that the visibility in the second lighting mode exceeds the visibility in the first lighting mode.

3. The automatic switching process according to claim 1, wherein the backscatter detection step is carried out by measuring a visibility distance.

4. The automatic switching process according to claim 3, wherein the lighting range is increased in accordance with the detected backscatter in such a way as to be able to measure the visibility distance up to a first visibility threshold, if the visibility distance measured is in excess of a second visibility threshold.

5. The automatic switching process according to claim 1, according to which the backscatter detection step is carried out by analyzing a curve of greyness levels obtained from an acquired image of the environment of motor vehicle.

6. The automatic switching process according to claim 5, according to which analysis of a curve of greyness levels involves determining an area within said curve, and detecting backscatter in accordance with at least one first surface threshold value in said area.

7. The automatic switching process according to claim 6, according to which the lighting range is increased in accordance with the detected backscatter in such a way as to be able to measure an area within said curve up to a first surface threshold, if the area reaches a second surface threshold value.

8. The automatic switching process according to claim 5, according to which the analysis of the curve of greyness levels involves determining at least one tangent to said curve, and detecting backscatter in accordance with at least one first inclination threshold value from a guiding coefficient of said at least one tangent.

9. The automatic switching process according to claim 8, according to which the lighting range is increased in accordance with the detected backscatter in such a way as to be able to measure a guiding coefficient from at least one tangent in said curve to a first inclination threshold, if the coefficient reaches a second inclination threshold value.

10. The automatic switching process according to claim 9, according to which it also involves a further step of authorizing the automatic switching of headlights from the first lighting mode to the second lighting mode once the backscatter reaches the first determined threshold.

11. The automatic switching process according to claim 1, according to which it also involves a further step of switching the headlights to the first lighting mode with a view to reducing backscatter of the beam of light from the headlights onto a phenomenon of visibility disturbance once the detected backscatter reaches a third threshold.

12. The automatic switching process according to claim 11, according to which it also involves a further step of prohibiting the automatic switching of the headlights from the first lighting mode to the second lighting mode once the detected backscatter reaches a third threshold.

13. The automatic switching process according to claim 11, according to which the headlights in the first lighting mode are switched, increasing the lighting range in relation to the maximum authorized range.

14. The automatic switching process according to claim 13, according to which the lighting range of the beam of light from the headlights is decreased as and when the backscatter increases.

15. The automatic switching process according to claim 1, according to which the lighting range is increased by using an elevation angle correction function to detect the beam of light from the headlights when motor vehicle is at a horizontal attitude.

16. The automatic switching process according to claim 1, according to which the lighting range is increased by using an interception function on part of the beam of light from the headlights.

17. A computer program product including one or more sequences of instructions executable by an information processing unit, the execution of which sequences of instructions makes it possible to commission the procedure according to claim 1.

18. An automatic headlight switching device designed to emit a beam of light for motor vehicle from one lighting mode to another lighting mode, comprising:
   a unit of increase of a lighting range of a beam of light from the headlights in relation to a maximum authorized range (BM) in accordance with a detected backscatter during said one lighting mode in order to improve a lighting of a phenomenon of visibility disturbance to enable said detected backscatter to be measured; and
   a control unit in order to:
      measure a visibility distance of said detected backscatter in response to said increase in said lighting rage of the beam of light; and
      detect backscatter of the beam of light from the headlights onto a phenomenon of visibility disturbance, when the headlights are in a first lighting mode; and
      switch the headlights to a second lighting mode once the backscatter reaches a first determined threshold.

19. The automatic switching device according to claim 18, according to which the unit of increase of the lighting range of the beam of light from the headlights involves a motor vehicle attitude corrector.

* * * * *